United States Patent
Dang et al.

(10) Patent No.: US 9,684,683 B2
(45) Date of Patent: Jun. 20, 2017

(54) SEMANTIC SEARCH TOOL FOR DOCUMENT TAGGING, INDEXING AND SEARCH

(71) Applicants: Jlangbo Dang, Cranbury, NJ (US);
Murat Kalender, Istanbul (TR);
Candemir Toklu, Princeton, NJ (US);
Kenneth Hampel, Yardley, PA (US)

(72) Inventors: Jlangbo Dang, Cranbury, NJ (US);
Murat Kalender, Istanbul (TR);
Candemir Toklu, Princeton, NJ (US);
Kenneth Hampel, Yardley, PA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 399 days.

(21) Appl. No.: 14/051,984

(22) Filed: Oct. 11, 2013

(65) Prior Publication Data

US 2014/0040275 A1 Feb. 6, 2014

Related U.S. Application Data

(63) Continuation-in-part of application No. 13/018,462, filed on Feb. 1, 2011, now Pat. No. 8,751,218.

(60) Provisional application No. 61/302,680, filed on Feb. 9, 2010, provisional application No. 61/714,823, filed on Oct. 17, 2012.

(51) Int. Cl.
*G06F 17/27* (2006.01)
*G06F 17/30* (2006.01)

(52) U.S. Cl.
CPC .... *G06F 17/30321* (2013.01); *G06F 17/2785* (2013.01); *G06F 17/3064* (2013.01); *G06F 17/30613* (2013.01); *G06F 17/30719* (2013.01)

(58) Field of Classification Search
CPC ........... G06F 17/2785; G06F 17/30613; G06F 17/3064; G06F 17/30719
See application file for complete search history.

(56) References Cited

U.S. PATENT DOCUMENTS

| | | | |
|---|---|---|---|
| 6,675,159 B1 * | 1/2004 | Lin | G06F 17/2705 |
| 7,509,313 B2 * | 3/2009 | Colledge | G06F 17/2785 |
| 7,558,778 B2 * | 7/2009 | Carus | G06N 99/005 |
| 7,925,610 B2 * | 4/2011 | Elbaz | G06F 17/30616 706/55 |
| 8,265,925 B2 * | 9/2012 | Aarskog | G06F 17/271 704/1 |

(Continued)

OTHER PUBLICATIONS

Buitelaar et al. "An unsupervised semantic tagger applied to German." Proceedings of Recent Advances in NLP (RANLP), Tzigov Chark, Bulgaria. 2001.*

*Primary Examiner* — Samuel G Neway

(57) ABSTRACT

A semantic tagging engine automatically generates semantic tags for the given documents and enables semantic search, based on meanings of search terms and content tags. A Semantic Knowledge Management Tool (SKMT) forms a semantic search and knowledge management platform to search, analyze and manage enterprise content. SKMT scans different content sources and generates indexes of semantic keywords. Its interface allows users to manage various data sources, search, explore and visualize search results at semantic level. SKMT provides high precision of semantic search and semantic data visualization.

16 Claims, 40 Drawing Sheets

(56) References Cited

U.S. PATENT DOCUMENTS

Figure 1:
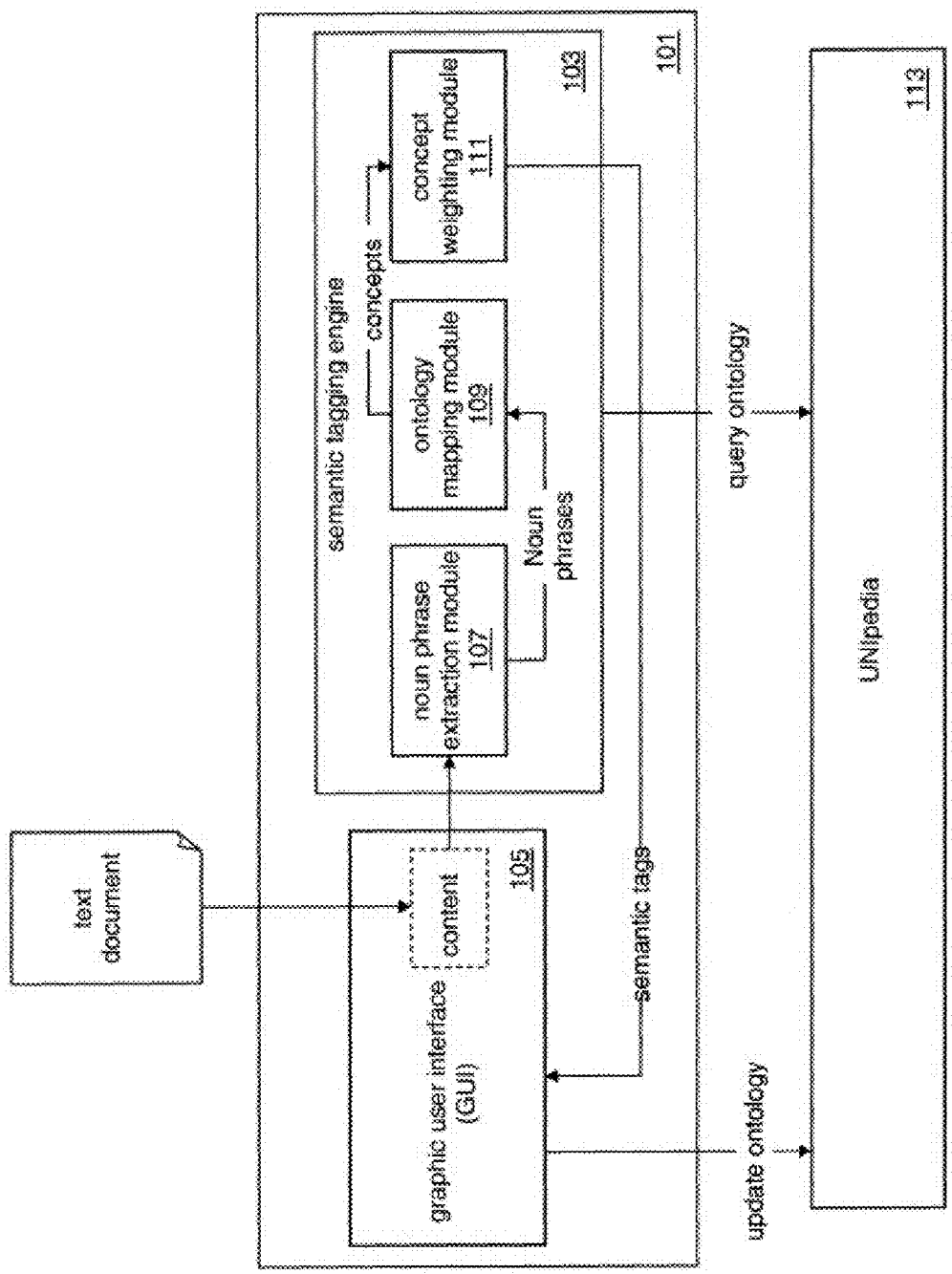

| | | | | |
|---|---|---|---|---|
| 8,380,511 B2* | 2/2013 | Cave | G10L 15/1815 | 704/238 |
| 8,510,327 B2* | 8/2013 | Boguraev | A61B 5/00 | 707/713 |
| 2002/0059161 A1* | 5/2002 | Li | G06F 17/30622 | |
| 2003/0135817 A1* | 7/2003 | Shear | G06F 17/30569 | 715/255 |
| 2004/0029085 A1* | 2/2004 | Hu | G06F 17/2745 | 434/178 |
| 2005/0256700 A1* | 11/2005 | Moldovan | G06F 17/2785 | 704/9 |
| 2005/0267871 A1* | 12/2005 | Marchisio | G06F 17/30672 | |
| 2006/0047632 A1* | 3/2006 | Zhang | G06F 17/30734 | |
| 2006/0235843 A1* | 10/2006 | Musgrove | G06F 17/30616 | |
| 2007/0011154 A1* | 1/2007 | Musgrove | G06F 17/2785 | |
| 2007/0088734 A1* | 4/2007 | Krishnamurthy | G06F 17/241 | |
| 2007/0185831 A1* | 8/2007 | Churcher | G06F 17/2785 | |
| 2007/0203885 A1* | 8/2007 | Kim | G06F 17/30707 | |
| 2008/0092054 A1* | 4/2008 | Bhumkar | G06F 17/30899 | 715/739 |
| 2008/0109212 A1* | 5/2008 | Witbrock | G06F 17/2785 | 704/9 |
| 2008/0235005 A1* | 9/2008 | Golan | H04L 67/306 | 704/9 |
| 2008/0288442 A1* | 11/2008 | Feigenbaum | G06F 17/30616 | |
| 2008/0288541 A1* | 11/2008 | Venturini | G06Q 10/10 | |
| 2009/0063473 A1* | 3/2009 | Van Den Berg | G06F 17/30684 | |
| 2009/0083027 A1* | 3/2009 | Hollingsworth | G06F 17/277 | 704/9 |
| 2009/0115785 A1* | 5/2009 | Grandhi | G06F 17/30994 | 345/440 |
| 2009/0287674 A1* | 11/2009 | Bouillet | G06F 17/30884 | |
| 2010/0030552 A1* | 2/2010 | Chen | G06F 17/30734 | 704/9 |
| 2010/0077001 A1* | 3/2010 | Vogel | G06F 17/30707 | 707/777 |
| 2010/0122151 A1* | 5/2010 | Mendelson | G06Q 10/10 | 715/209 |
| 2011/0119047 A1* | 5/2011 | Ylonen | G06F 17/2785 | 704/9 |
| 2011/0196670 A1* | 8/2011 | Dang | G06F 17/2785 | 704/9 |
| 2014/0040275 A1* | 2/2014 | Dang | G06F 17/2785 | 707/741 |

* cited by examiner

| CC | Coordinating conjunction | RP | Particle |
|---|---|---|---|
| CD | Cardinal number | SYM | Symbol |
| DT | Determiner | TO | to |
| EX | Existential there | UH | Interjection |
| FW | Foreign word | VB | Verb, base form |
| IN | Preposition | VBD | Verb, past tense |
| JJ | Adjective | VBG | Verb, gerund/present participle |
| JJR | Adjective, comparative | VBN | Verb, past participle |
| JJS | Adjective, superlative | VBP | Verb, non-3rd ps. sing. present |
| LS | List item marker | VBZ | Verb, 3rd ps. sing. present |
| MD | Modal | WDT | wh-determiner |
| NN | Noun, singular or mass | WP | wh-pronoun |
| NNP | Proper noun, singular | WP$ | Possessive wh-pronoun |
| NNPS | Proper noun, plural | WRB | wh-adverb |
| NNS | Noun, plural | `` | Left open double quote |
| PDT | Predeterminer | , | Comma |
| POS | Possessive ending | '' | Right close double quote |
| PRP | Personal pronoun | . | Sentence-final punctuation |
| PRP$ | Possessive pronoun | : | Colon, semi-colon |
| RB | Adverb | $ | Dollar sign |
| RBR | Adverb, comparative | # | Pound sign |
| RBS | Adverb, superlative | -LRB- | Left parenthesis * |
|  |  | -RRB- | Right parenthesis * |

FIG. 9

| Algorithm (%) | CATEGORY | DOMAIN | HYPERNYM | HOLONYM | SUM | RANK | SUM+ |
|---|---|---|---|---|---|---|---|
| Precision | 43.7385 | 40.2737 | 54.2291 | 76.9535 | 55.9438 | 79.7646 | 79.5692 |
| Recall | 28.0987 | 25.7063 | 51.1087 | 30.8355 | 53.6455 | 79.7646 | 79.5692 |
| F-measure | 34.2161 | 31.3819 | 52.6227 | 44.0287 | 54.7706 | 79.7646 | 79.5692 |

```
<file:/E:/Projects/SKM/cnn/0.txt> <http://aperture.sourceforge.net/2007/07/19/mad#dateAsN
a nfo:FileDataObject , nfo:FileDataObject , nie:DataObject , nfo:PlainTextDocument ;
nfo:fileLastModified "2009-08-04T17:50:47"^^<http://www.w3.org/2001/XMLSchema#dateTime
nfo:fileName "0.txt" ;
nfo:belongsToContainer <file:/E:/Projects/SKM/cnn/> ;
ads:date "1249397447000"^^<http://www.w3.org/2001/XMLSchema#long> ;
nfo:fileSize "1770"^^<http://www.w3.org/2001/XMLSchema#long> ;
nie:mimeType "text/plain" ;
ads:size "1770"^^<http://www.w3.org/2001/XMLSchema#long> ;
ads:initialText "F1 team chief Brawn caught speeding" ;
nie:language "en" ;
ads:significantTerm "magistrate" , "ferrari" , "benetton" , "ross brawn" , "jenson" ,
<http://scr.siemens.com/semtag> <http://scr.siemens.com/100001740 100001930 100002684
```

FIG. 21

SEMANTIC SEARCH TOOL FOR DOCUMENT TAGGING, INDEXING AND SEARCH

CROSS REFERENCE TO RELATED APPLICATIONS

The present application is a continuation-in-part of U.S. patent application Ser. No. 13/018,462 filed on Feb. 1, 2011, which claims priority to and the benefit of U.S. Provisional Patent Application Ser. No. 61/302,680, both of which are incorporated herein by reference. The present application also claims priority to and the benefit of U.S. Provisional Patent Application Ser. No. 61/714,823 filed on Oct. 17, 2012, which is also incorporated herein by reference.

TECHNICAL FIELD

The invention relates generally to computational semantic content tagging and search. More specifically, the invention relates to a method and processor system to perform automatic tagging by assigning keywords together with semantic linkages among keywords to documents, which is called Semantic tagging, and a method and processor system that use these semantic tags to index documents and improve search experience and results.

BACKGROUND

In typical commercial Knowledge Management (KM) is a set of practices that covers identifying, generating, sharing and utilizing knowledge. As an efficient manner, Web-based collaborative tools, such as wiki and blogs, need cutting edge content tagging and search technologies to foster collaborations and knowledge management. These technologies have resulted in substantial improvements in locating, contributing and sharing knowledge.

It has become increasingly difficult to share knowledge or locate the right information and people within organization resources, since we are surrounded with a vast amount of information. As a result, corporations are always interested in managing and sharing intellectual assets, and maintaining the exponentially increasing number of content within an organization.

With an ever increasing amount of content, we heavily rely on search engine to locate documents. However, existing search tools are experiencing difficulties: keyword based search often return results with low precision and recall. An approach for mitigating this issue is to use content tags. Content tagging helps users to describe and organize content as described in "[2] Hak Lae Kim, Alexandre Passant, John G. Breslin, Simon Scerri, and Stefan Decker, "Review and Alignment of Tag Ontologies for Semantically-Linked Data in Collaborative Tagging Spaces," in *ICSC '08: Proceedings of the* 2008 *IEEE International Conference on Semantic Computing*, Washington, D.C., USA, 2008, pp. 315-322."

Good tags provide relevant and brief information about resources. The user generated tagging approach has resulted in improvements in locating information; therefore it is getting more popular. Many popular Web sites support tagging (i.e. Delicious, Facebook™, Flickr™ and YouTube™).

As an economical ways to improve content management and search, the user generated tagging has major limitations because it is (1) free from context and form, (2) user generated, (3) used for purposes other than description, and (4) often ambiguous. Since tagging is a subjective, time-consuming voluntary work, most available documents are not tagged at all.

Automatic tagging can overcome some of the above issues by analyzing documents and offer significant terms as tags without user intervention.

Semantic web technologies are seen as the enabler technology for effectively maintaining and retrieving information. Semantic Knowledge Management is a set of practices that maintains data with its metadata in a machine readable format. This approach would leverage usage of intelligent semantic content tagging, indexing and search methods, and would reduce the cost and time to localize content as described in "[1] Wikipedia. Knowledge Management. [Online]. http://en.wikipedia.org/wiki/Knowledge_management; on WWW on Sep. 16, 2013."

Currently, search results in documents in computer systems based on automatic tagging are not satisfactory. Accordingly novel and improved methods and systems for automatic Semantic tagging and search of documents are required.

SUMMARY

The inventors have discovered that it would be desirable to have methods and systems that perform automated semantic tagging. Automated semantic tagging produces semantically linked tags for a given text content. Embodiments provide ontology mapping algorithms and concept weighting algorithms that create accurate semantic tags that can be used to improve enterprise content management, and search for better knowledge management and collaboration. Embodiments map text content to entities defined in an ontology such as UNipedia, developed by the Siemens Knowledge Management Team. UNipedia is a universal domain-independent ontology that unifies different ontological knowledge bases by reconciling their instances as WordNet concepts. For domain-dependent applications, embodiments can use the same approach to map text content to entities defined in domain-specific ontologies.

Embodiments include ontology mapping and a linear time O(n) lexical chaining Word Sense Disambiguation (WSD) algorithm to perform the mapping process. A lexical chaining algorithm disambiguates terms based on several ontological features (properties). The lexical chaining algorithm provides: (1) a computation efficient approach to mapping concepts in real-time, (2) information for weighting concepts and finding significant ones, and (3) extracting semantics without depending on any prior knowledge.

A comparative evaluation of the ontological and statistical features for the WSD task is presented with use of a graphical framework. The performances of four ontological properties and a statistical property are evaluated on the SemCor and Senseval sense annotated datasets. Statistical and ontological features are used for weighting the semantic tags, which are recommended to content authors.

Embodiments also employ a Graphical User Interface (GUI) to visualize the results. With this interface, users can modify input parameters and view the generated output in two dimensional and three dimensional semantically connected graphs.

In contrast to existing semantic tagging systems, embodiments (1) use UNipedia as a knowledge base to cover most named entities, (2) disambiguate terms us an improved linear time lexical chaining algorithm by summarizing weighted WSD scores from different lexical chains, and (3)

weight tag significance within a document using both ontological and statistical features.

One aspect of the invention provides a semantic tagging method that outputs semantically linked tags for text content. Methods according to this aspect include inputting the text content, extracting nouns and noun phrases from the text content, mapping the extracted nouns and noun phrases to terms of an ontology, mapping the extracted nouns and noun phrases to a correct sense of the ontology terms using lexical chaining Word Sense Disambiguation (WSD) algorithms, weighting the significance of the extracted nouns' and noun phrases' concepts from their ontological and statistical features, extracting key-phrases from the weighted concepts, and outputting the key-phrases as semantic tags.

Another aspect of the invention is wherein extracting nouns and noun phrases from the text content further comprises detecting sentences from the text content, detecting tokens {words) from the detected sentences, labeling the tokens, and extracting consecutive noun tokens and noting their frequency of use.

Another aspect of the invention is wherein mapping the extracted nouns and noun phrases to terms of an ontology further comprises accessing the ontology, comparing the nouns and noun phrases with the ontology terms, and if there is an exact match, retrieving the ontology term, and if there is not an exact match, performing phrase mapping using a rule-based algorithm.

Another aspect of the invention is wherein mapping the extracted nouns and noun phrases to a correct sense of the ontology terms further comprises creating a hypernym lexical chain with WSD scores for senses of the input nouns and noun phrases, creating a domain lexical chain with WSD scores for senses of the input nouns and noun phrases, creating a holonym lexical chain with WSD scores for senses of the input nouns and noun phrases, creating a category lexical chain with WSD scores for senses of the input nouns and noun phrases, normalizing the WSD scores in each of the hypernym, domain, category and holonym lexical chains, generating a WSD score using a sense rank algorithm, assigning weights to each algorithm and summing the weighted WSD scores for the hypernym, domain, category, holonym lexical chains, and the sense rank algorithm, evaluating the hypernym, domain, category and holonym lexical chains, the sense rank algorithm and optimizing their weights for a given target data, and mapping the nouns and noun phrases to a highest ranked sense.

Another aspect of the invention is wherein weighting the significance of the hypernym, domain, category and holonym lexical chains further comprises computing semantic Term Significance (TS) scores using lexical chaining WSD scores derived from previous phrase, Depth and Information Content (IC) values, computing statistical TS scores using Term Frequency (TF) and Inverse Google Popularity (IGP), computing concept TS scores by summing the semantic and statistical scores, sorting concepts by their concept TS scores descending order and extracting top key-phrases, diversifying key-phrase distribution over different categories using heuristics, and clustering key-phrases according to categories such as people, event, location, time, etc. to describe the text content.

Another aspect of the invention is wherein extracting key-phrases from the weighted concepts further comprises filtering all key-phrases (redundant senses) except the top ranked key-phrase of a sense, and filtering key-phrases that have a lower frequency than all occurrences of its children concepts.

In accordance with an aspect of the present invention a method is provided for performing a semantic search to retrieve documents from a document repository, comprising a processor accepting through a graphical interface a search phrase provided by a user, the processor analyzing the search phrase and suggesting a plurality of semantic search phrases generated from a stored vocabulary of an ontology to suggest a context, the processor accepting a first semantic search phrase selected from the plurality of semantic search phrases, the processor indexing and semantically tagging a plurality of documents in a storage medium, wherein at least one document was unstructured prior to the indexing and semantically tagging, the processor extracting a plurality of semantic tags from the indexed and semantically tagged documents; and the processor defining a plurality of groups based on the indexed and tagged documents.

In accordance with a further aspect of the present invention a method is provided, wherein the at least one unstructured document is stored in a local file and is semantically indexed before the search phrase is accepted by the processor.

In accordance with yet a further aspect of the present invention a method is provided, wherein the processor retrieves the at least one unstructured document via an Internet and semantically tags and indexes the retrieved document after the search phrase is accepted by the processor.

In accordance with yet a further aspect of the present invention a method is provided, wherein the documents in the plurality of documents are indexed with unique identifications of semantic tags.

In accordance with yet a further aspect of the present invention a method is provided, wherein the processor searches the indexed documents based on a unique identification of the first semantic search phrase.

In accordance with yet a further aspect of the present invention a method is provided, wherein the semantically tagging enables a structured query search of the document that was unstructured.

In accordance with yet a further aspect of the present invention a method is provided, wherein a group is determined by a keyword that occurs in a selected document in the storage medium.

In accordance with yet a further aspect of the present invention a method is provided, wherein a group is determined by a semantic tag that occurs in a selected document in the storage medium.

In accordance with yet a further aspect of the present invention a method is provided, wherein the group is represented in a semantic tag cloud.

In accordance with yet a further aspect of the present invention a method is provided, further comprising: selecting a group in the plurality of groups and updating the semantic search in accordance with the selected group.

In accordance with another aspect of the present invention a system is provided to perform a semantic search to retrieve documents from a document repository, comprising: a memory configured to store and retrieve data, including instructions, a processor configured to execute instructions retrieved from the memory to perform the steps: accepting a search phrase, analyzing the search phrase and suggesting a plurality of semantic search phrases generated from a stored vocabulary of an ontology to suggest a context, accepting a first semantic search phrase selected from the plurality of semantic search phrases, storing in a storage medium at least one unstructured document, indexing and semantically tagging a plurality of documents including the at least one unstructured document in the storage medium, extracting a plurality of semantic tags from the indexed and semantically tagged documents and defining one or more groups based on the indexed and tagged documents.

In accordance with yet another aspect of the present invention a system is provided, wherein documents are stored in a local file and the documents are semantically indexed before the search phrase is accepted by the processor.

In accordance with yet another aspect of the present invention a system is provided, wherein the processor retrieves the at least one unstructured document via an Internet based on the search phrase and semantically tags and indexes the at least one unstructured document to make it a structured document.

In accordance with yet another aspect of the present invention a system is provided, wherein the documents in the plurality of documents are indexed with unique identifications of semantic tags.

In accordance with yet another aspect of the present invention a system is provided, wherein the processor searches the indexed documents based on a unique identification of the first semantic search phrase.

In accordance with yet another aspect of the present invention a system is provided, wherein the semantically tagging enables a structured query search of the at least one document that was previously unstructured.

In accordance with yet another aspect of the present invention a system is provided, wherein a group is determined by a keyword that occurs in a selected document in the storage medium.

In accordance with yet another aspect of the present invention a system is provided, wherein a group is determined by a semantic tag that occurs in a selected document in the storage medium.

In accordance with yet another aspect of the present invention a system is provided, wherein the group is represented in a semantic tag cloud.

In accordance with yet another aspect of the present invention a system is provided, further comprising the steps performed by the processor: selecting a group in the plurality of groups and updating the semantic search in accordance with the selected group.

DRAWINGS

Figure 3:
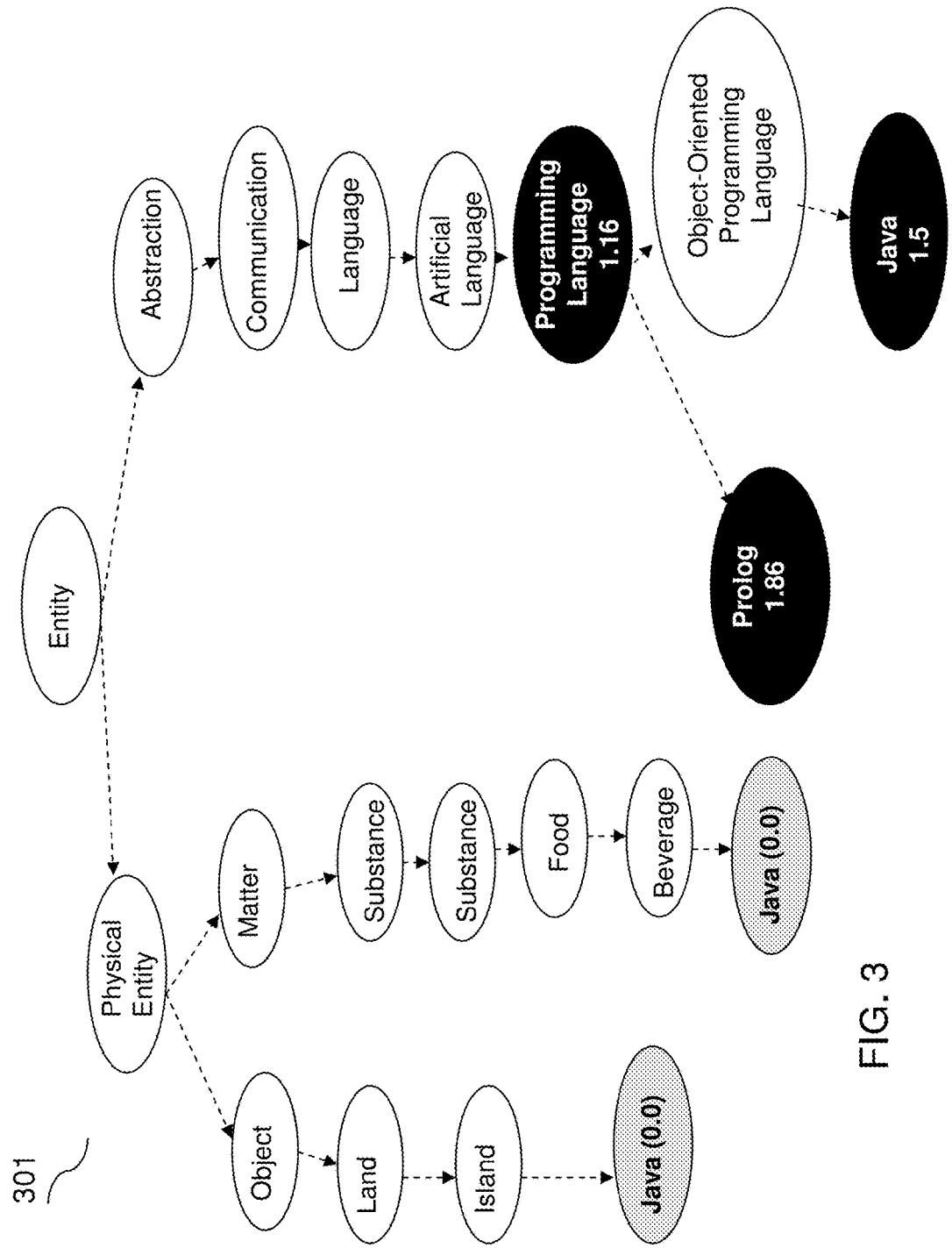
Figure 4:
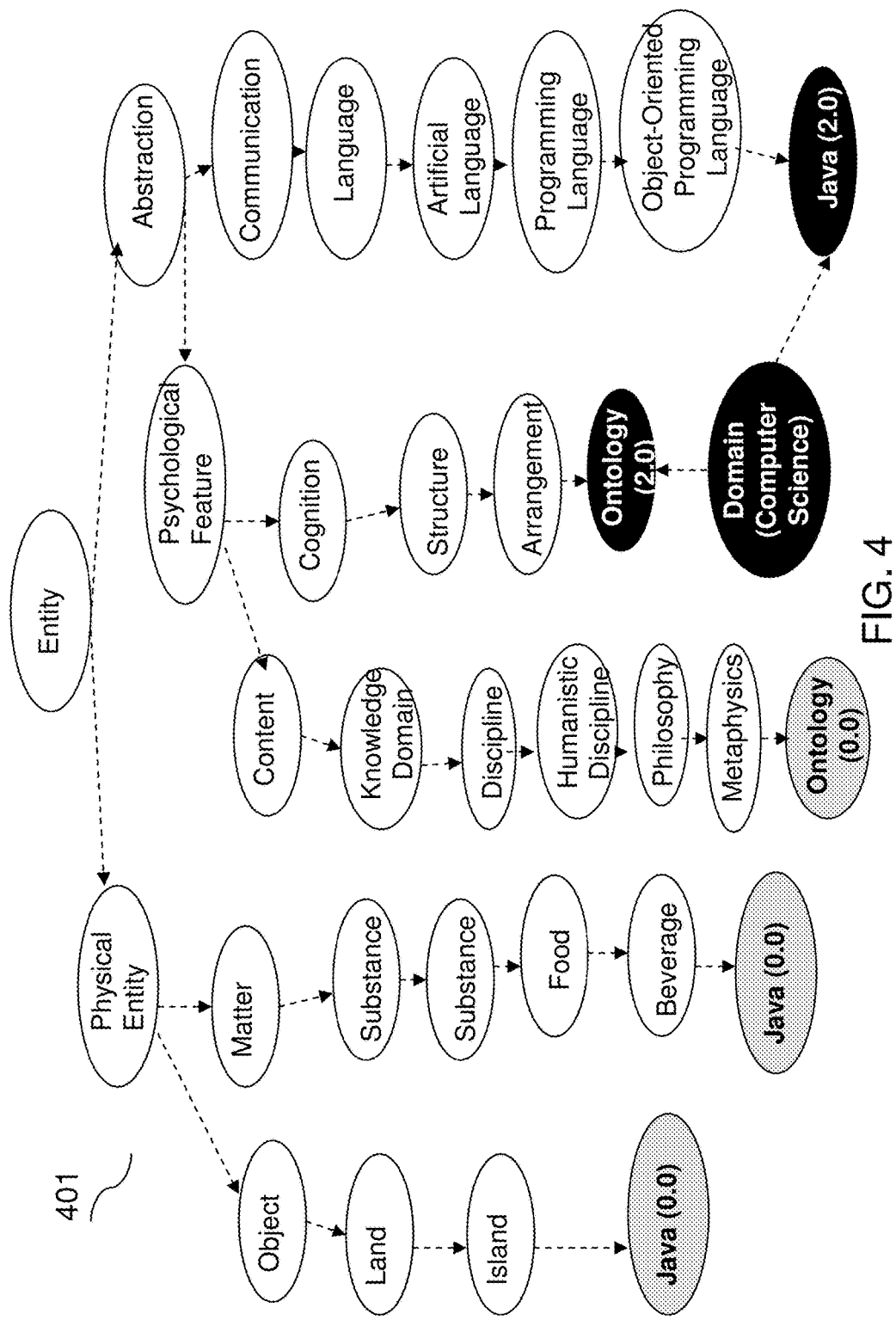
Figure 5:
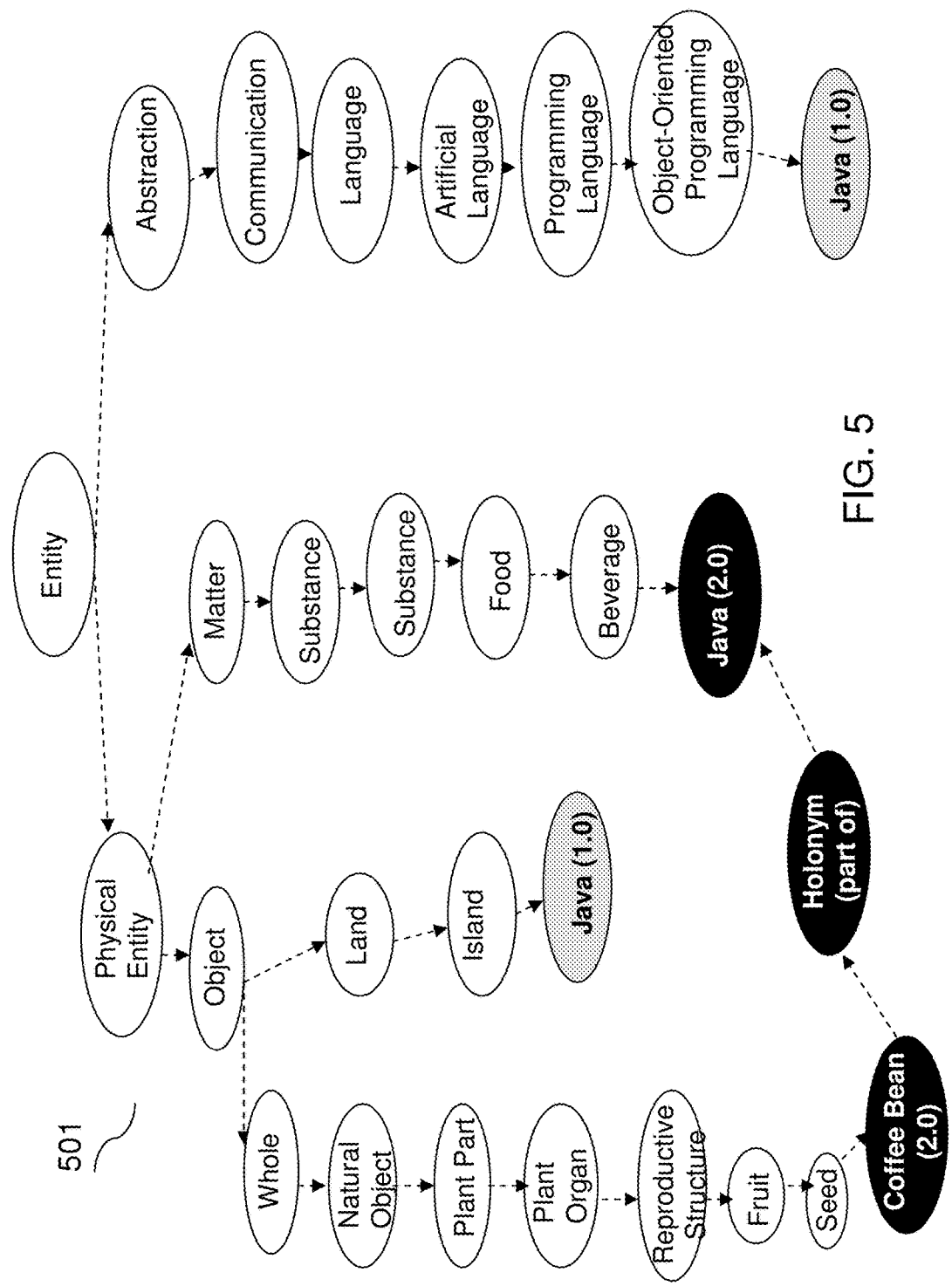
Figure 6:
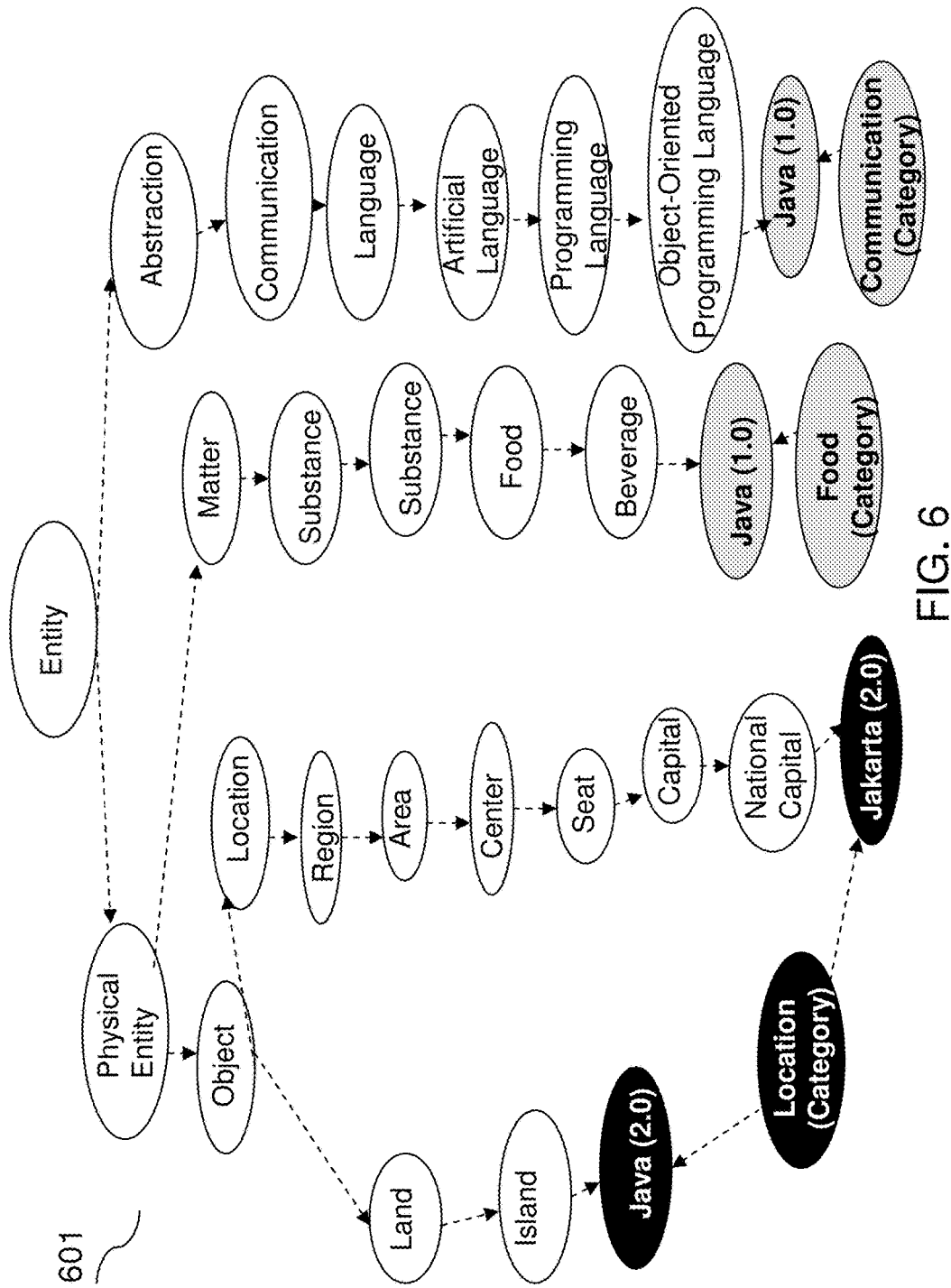
Figure 7A:
Figure 7B:
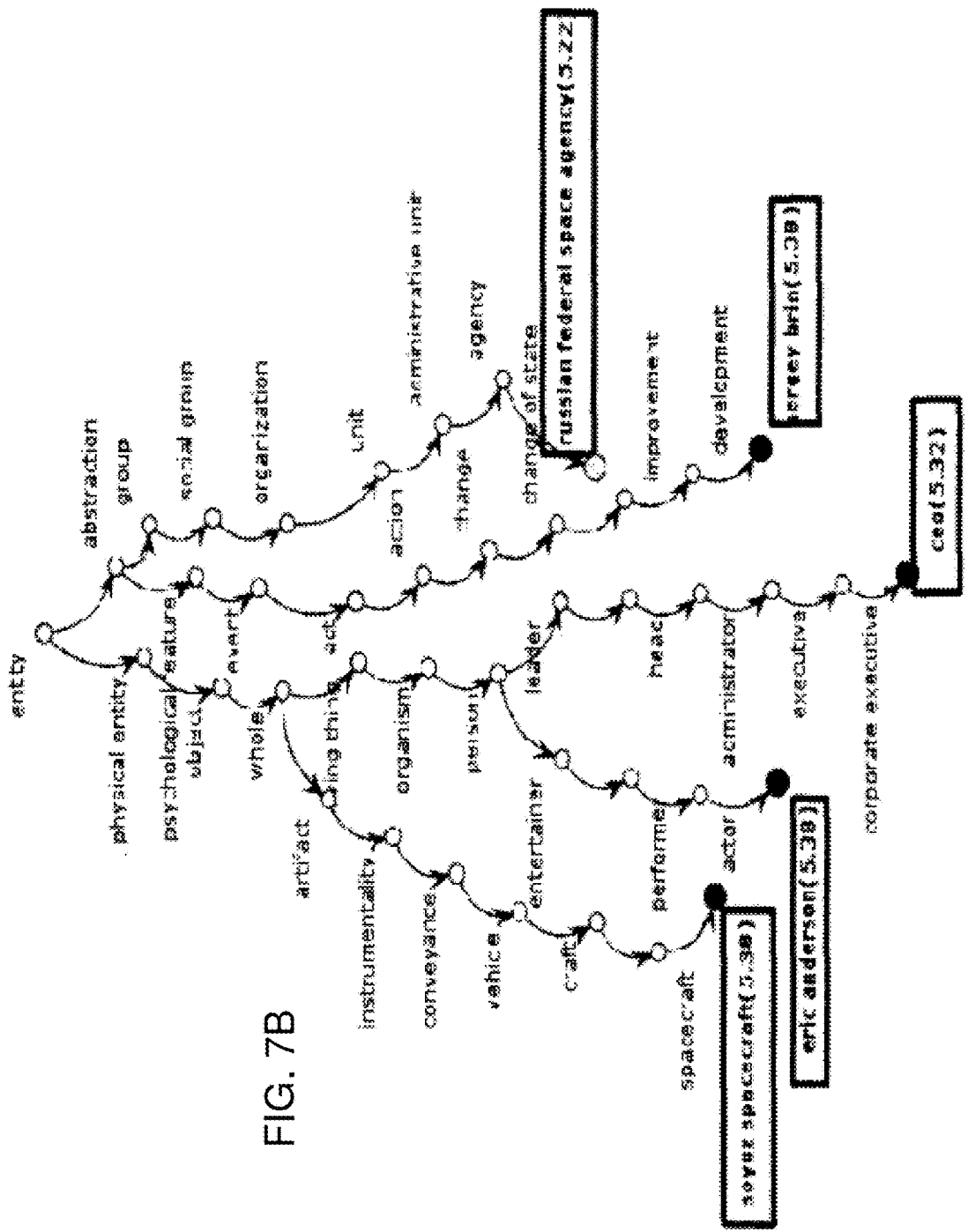
Figure 8:
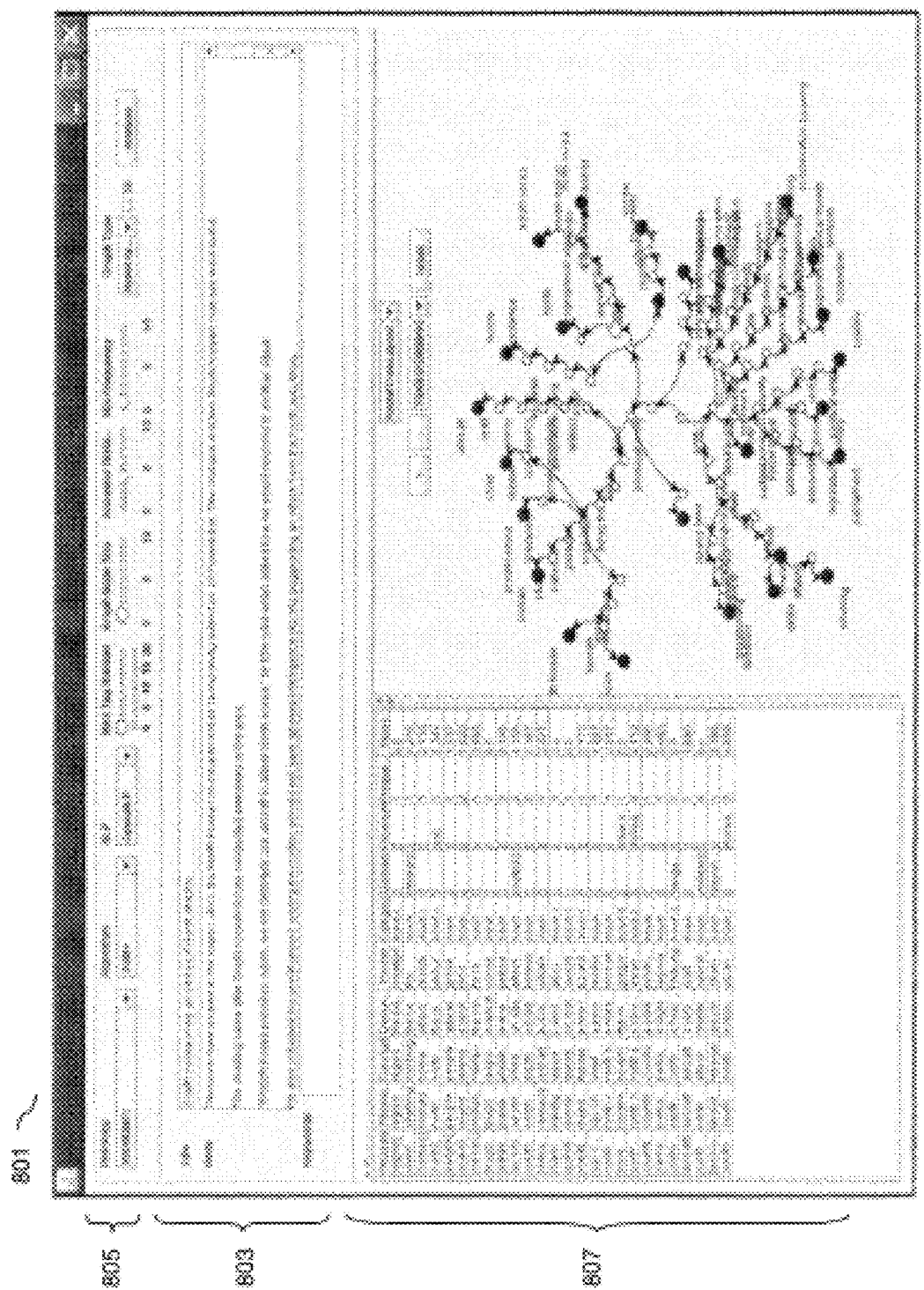
Figure 11:
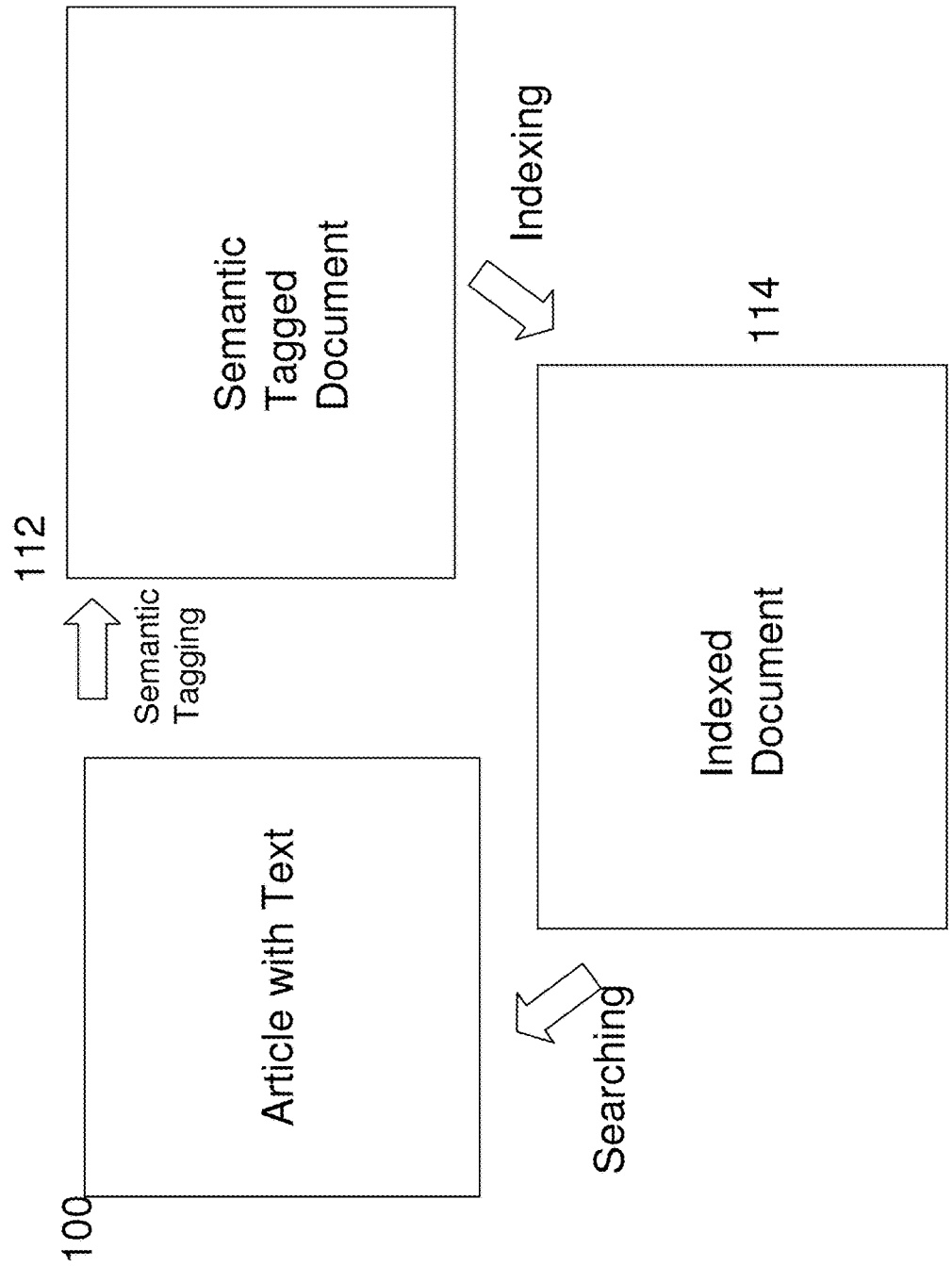
Figure 12:
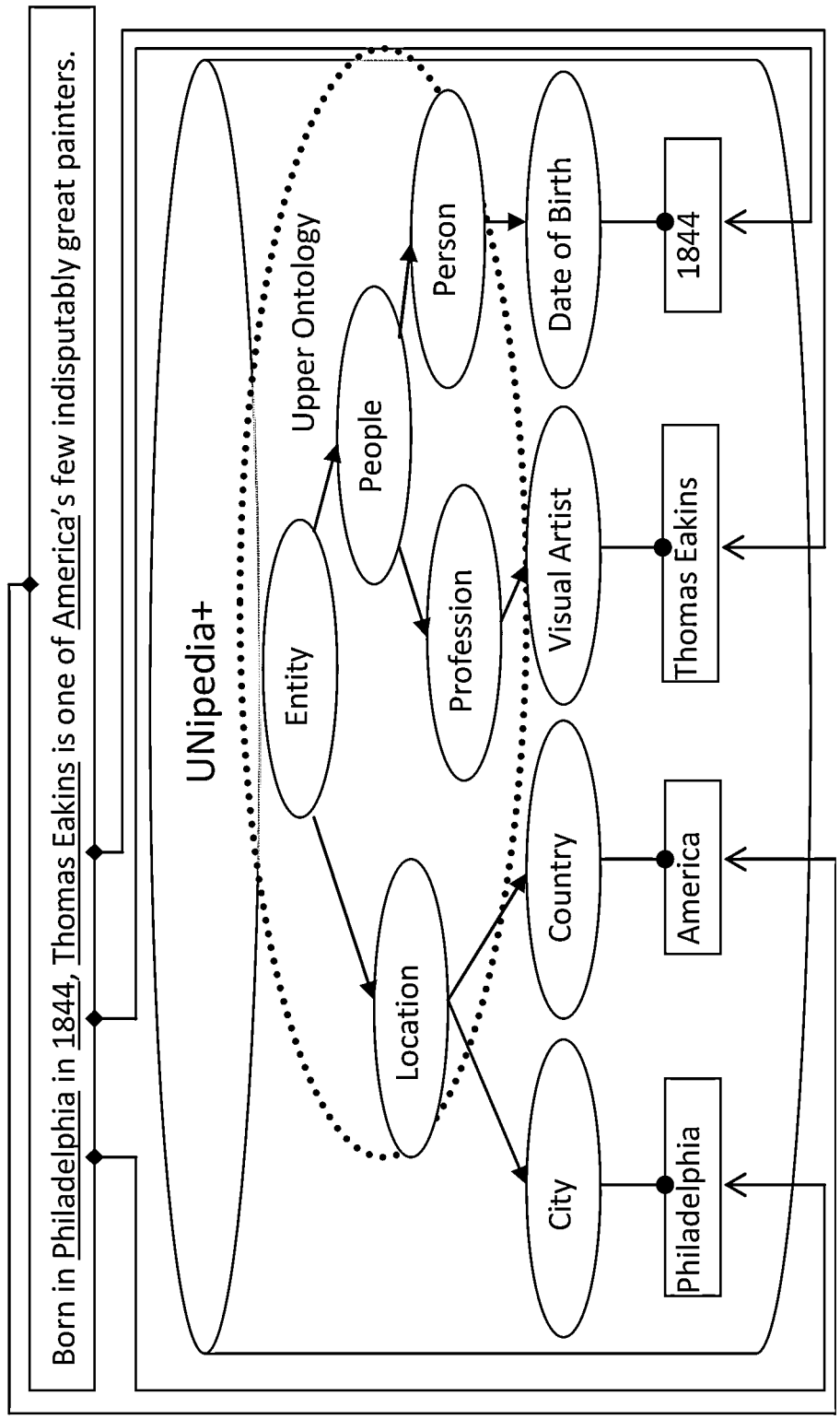
Figure 13:
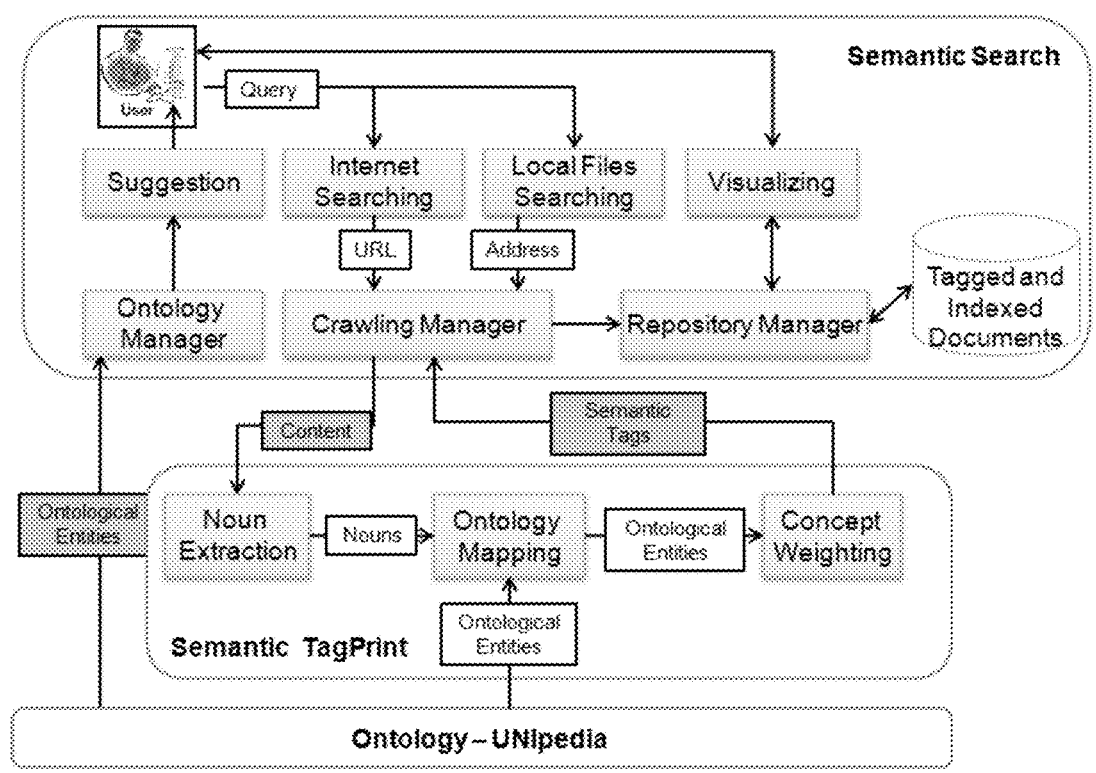
Figure 14:
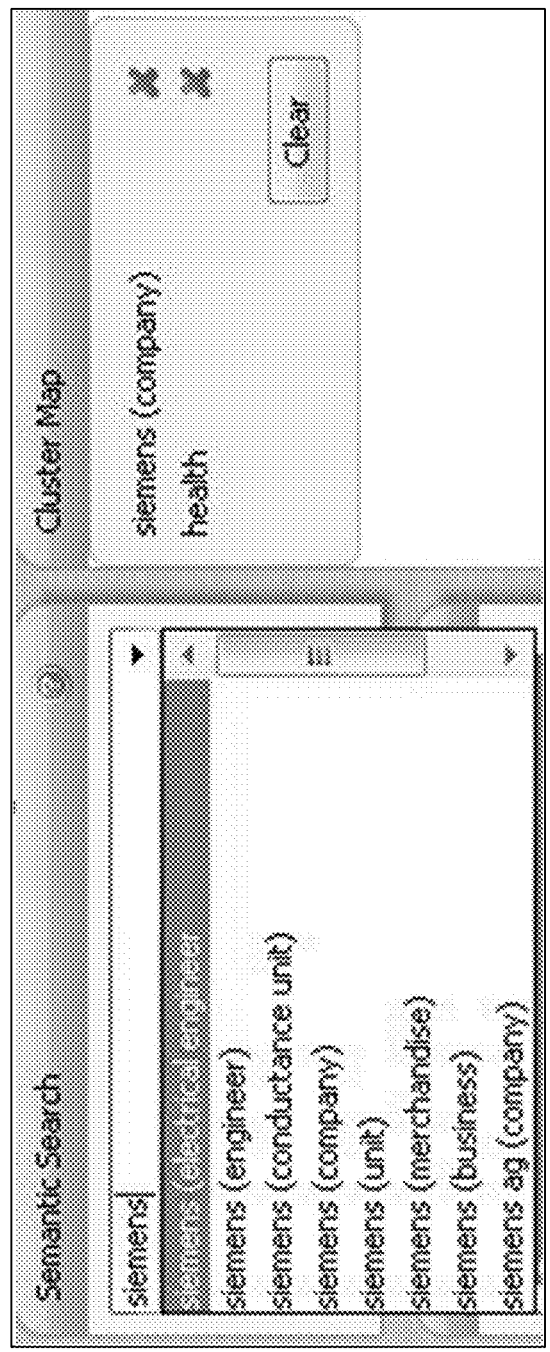
Figure 16:
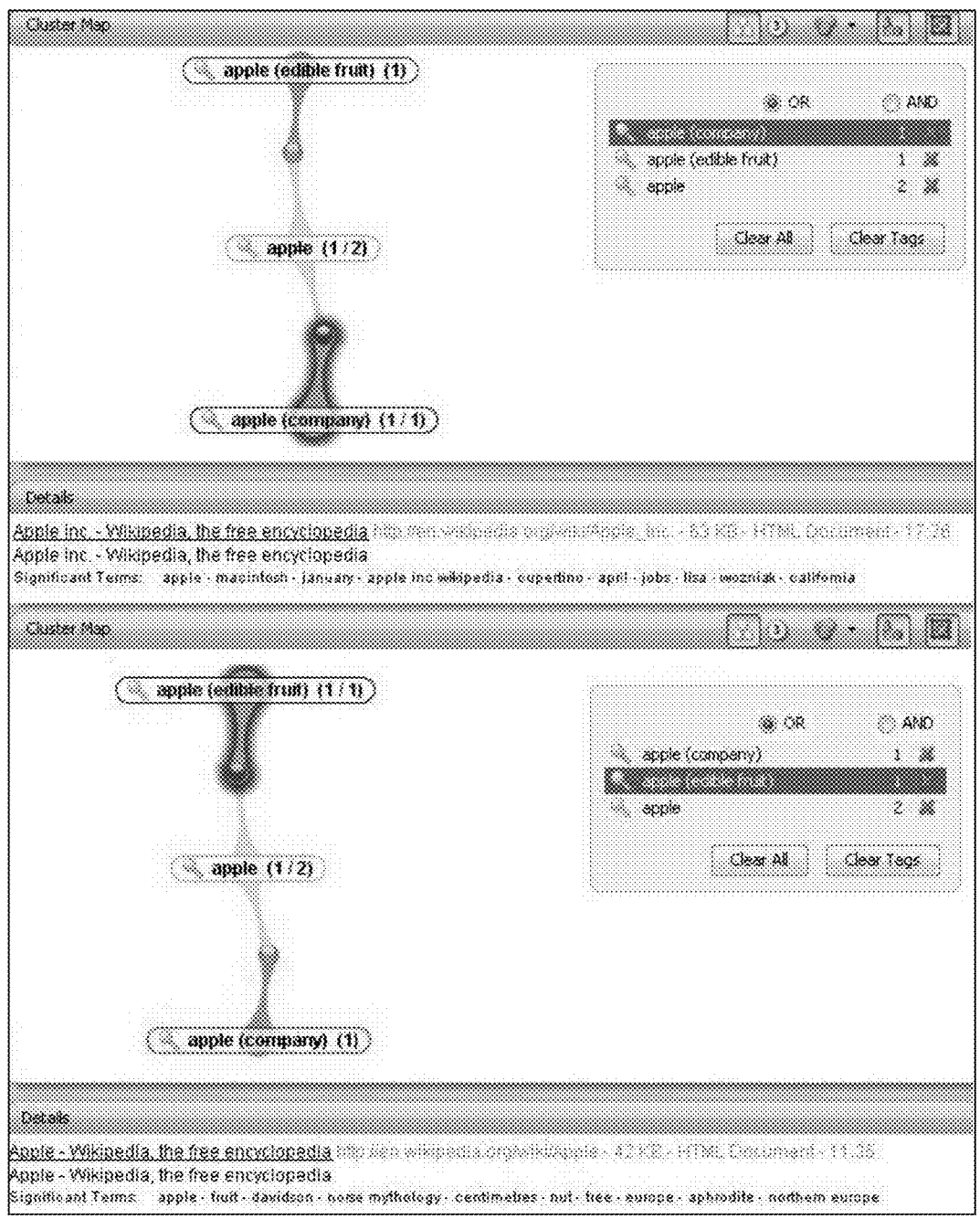
Figure 17:
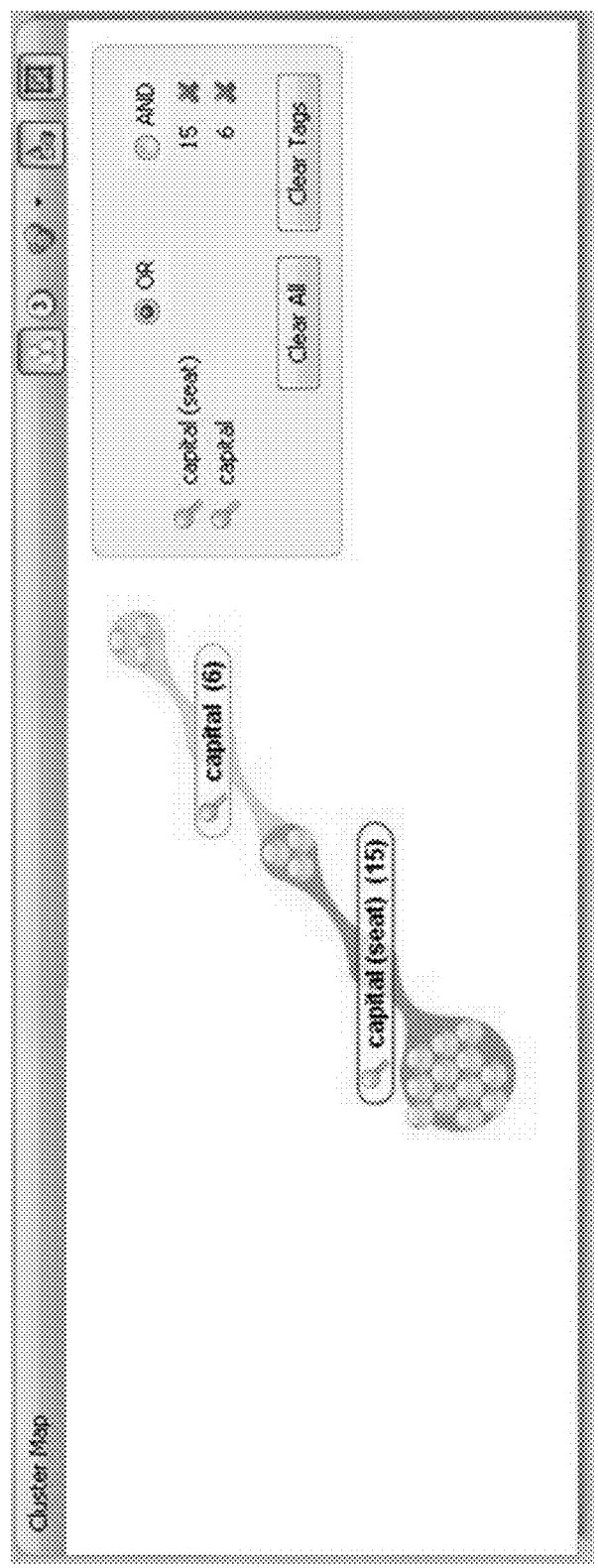
Figure 18:
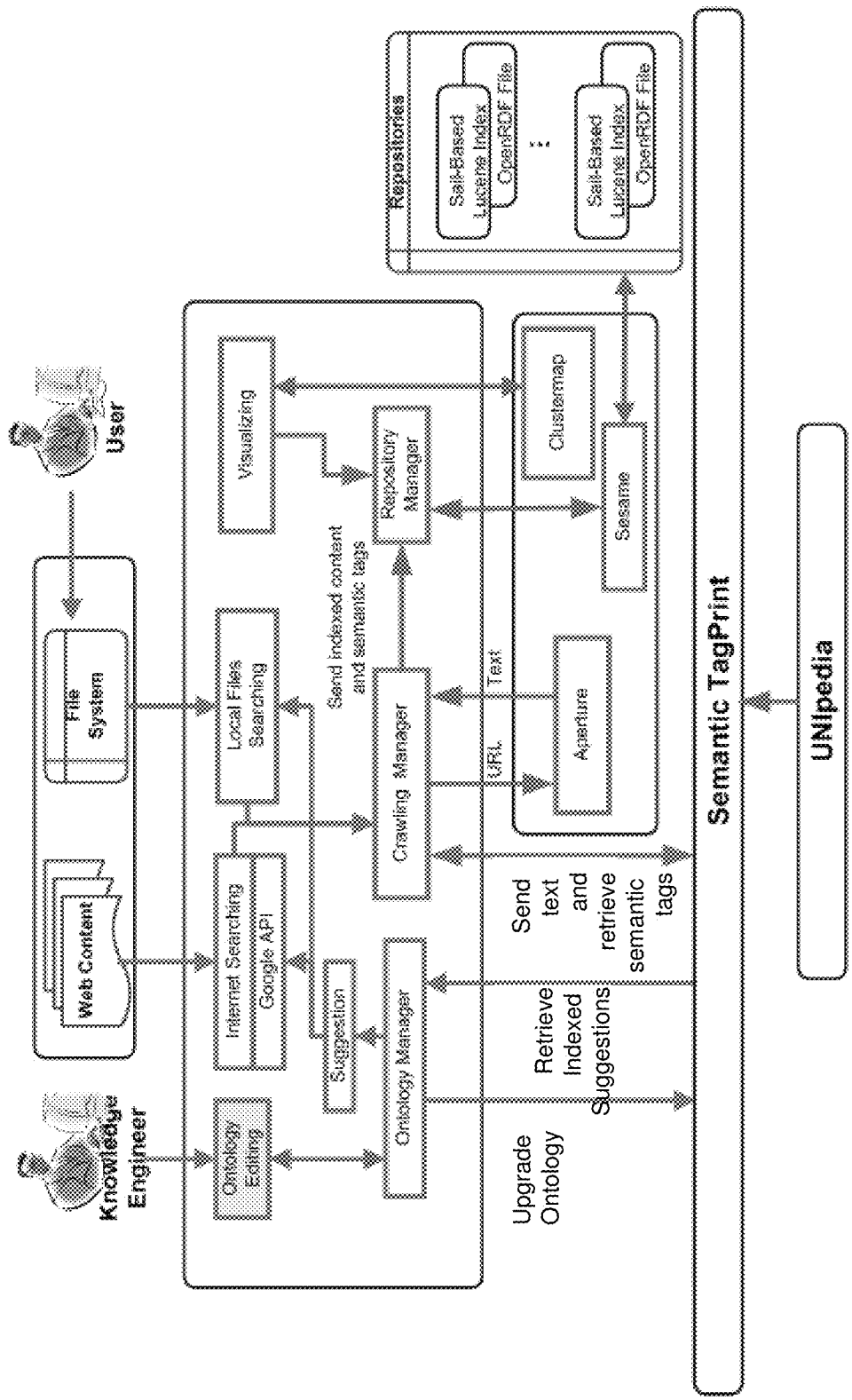
Figure 19A:
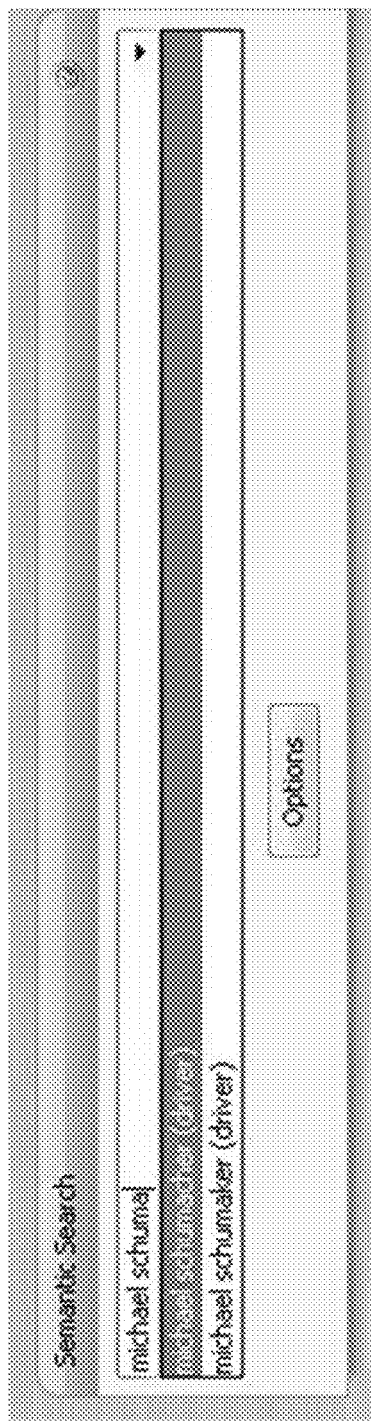
Figure 19C:
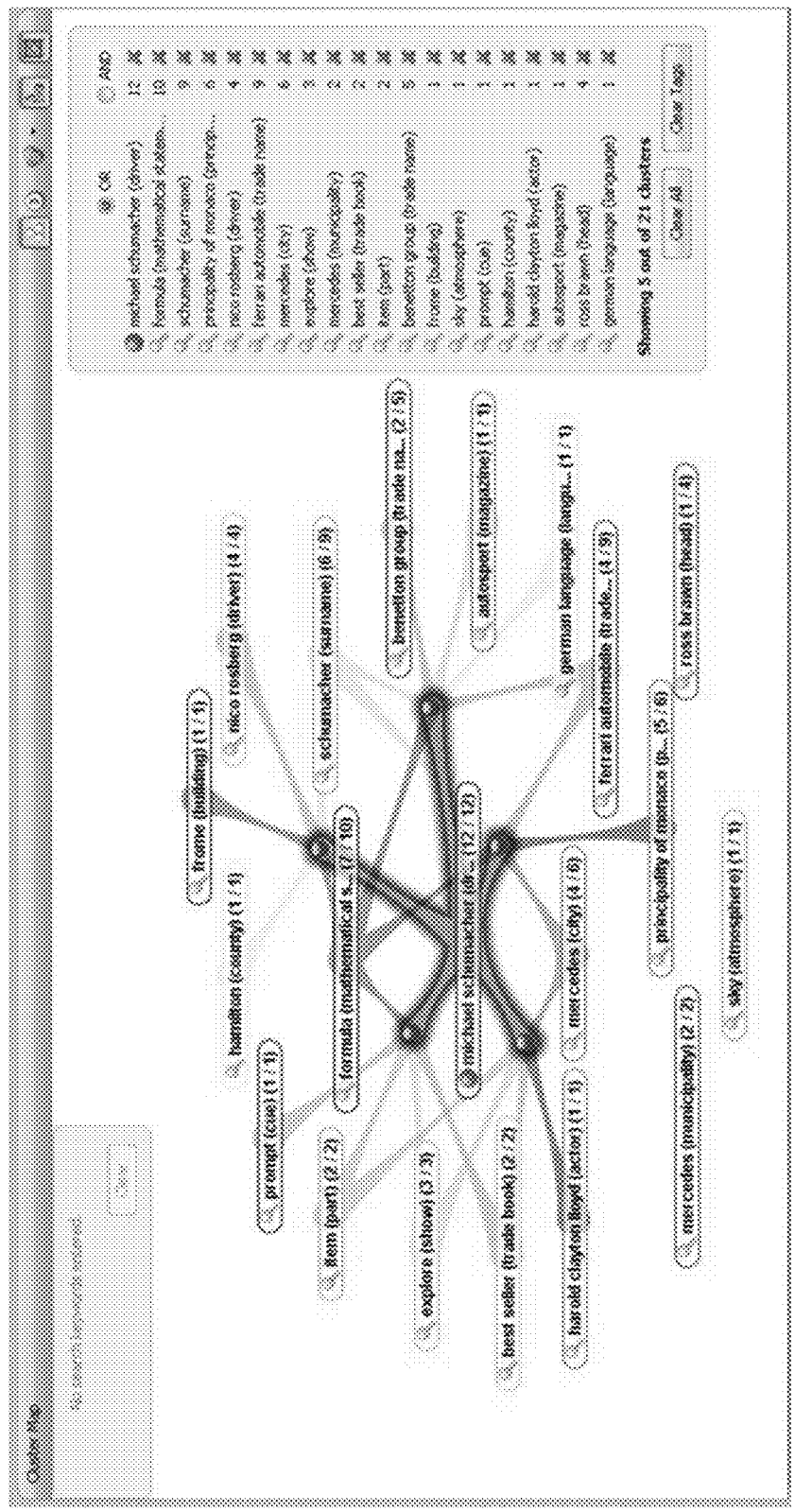
Figure 19D:
Figure 20:
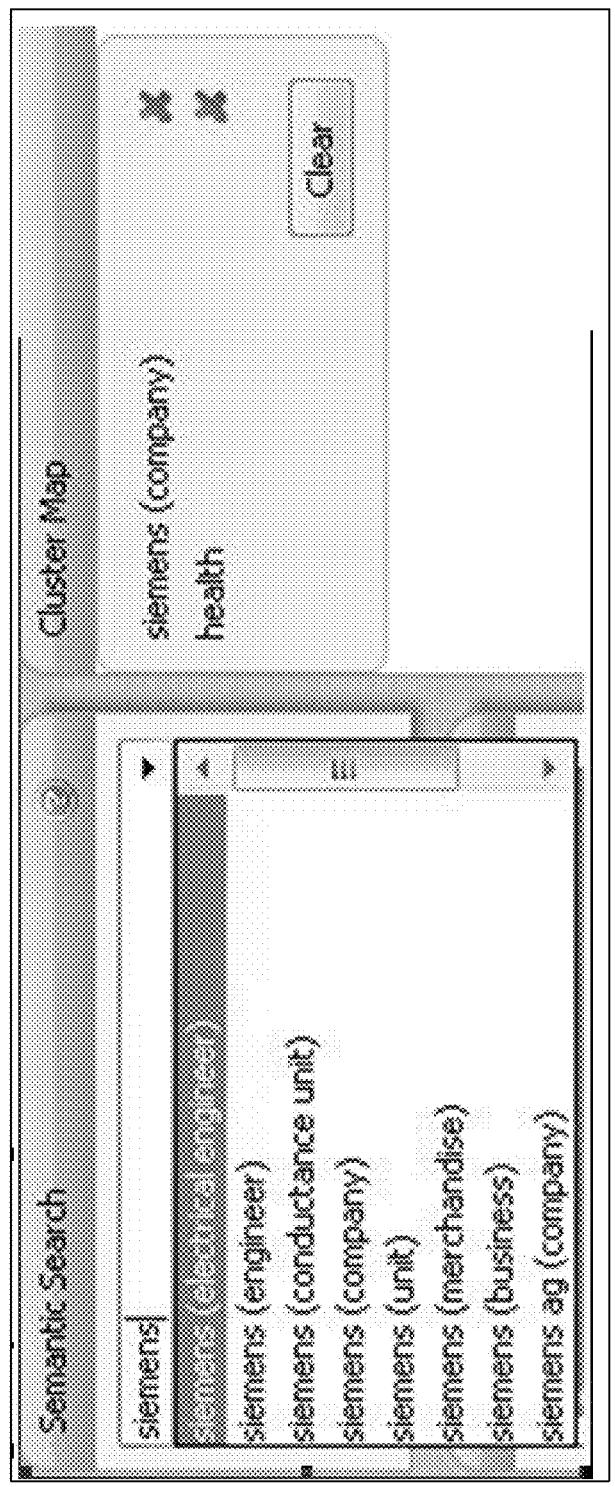
Figure 22:
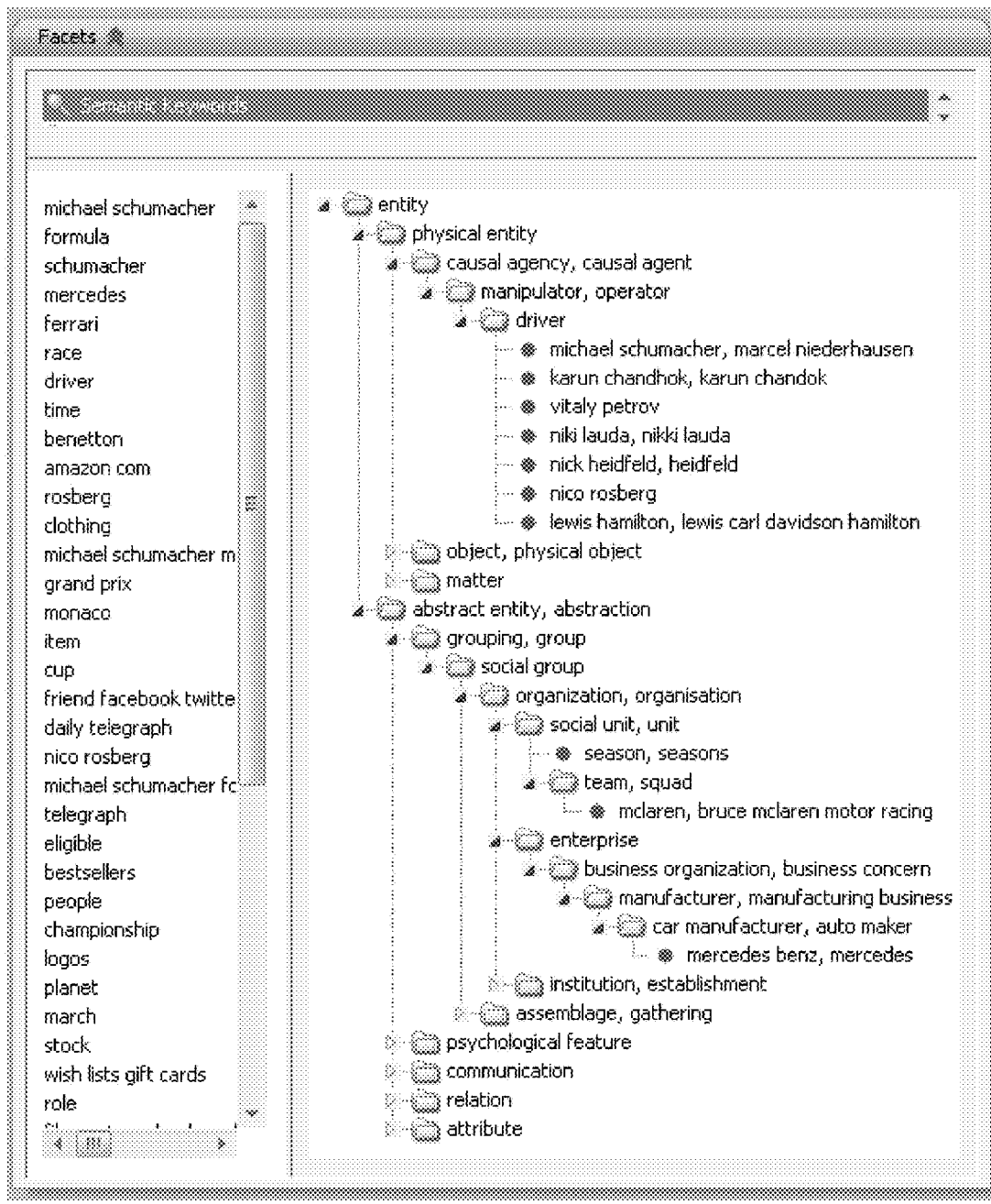
Figure 23:
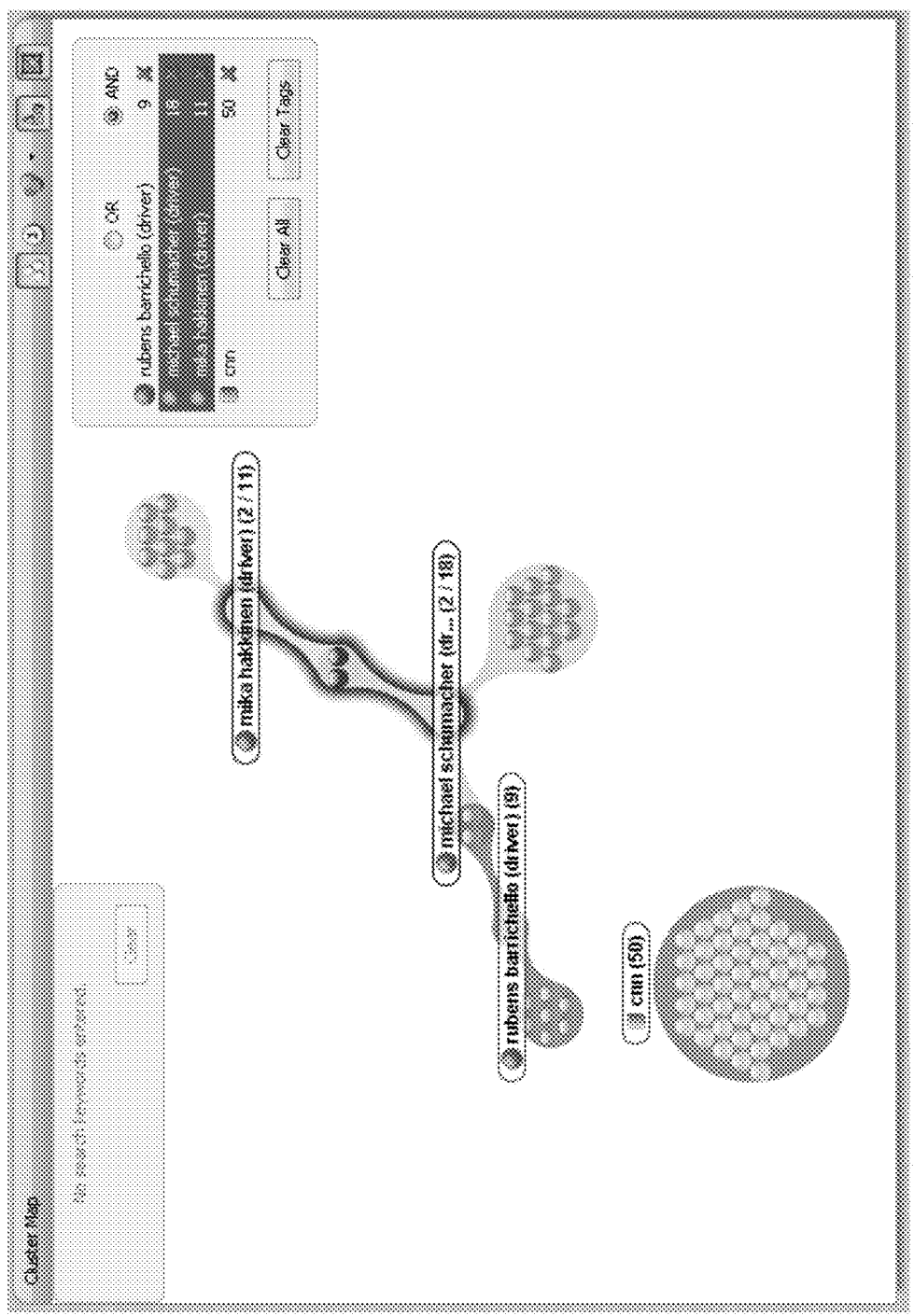
Figure 24:
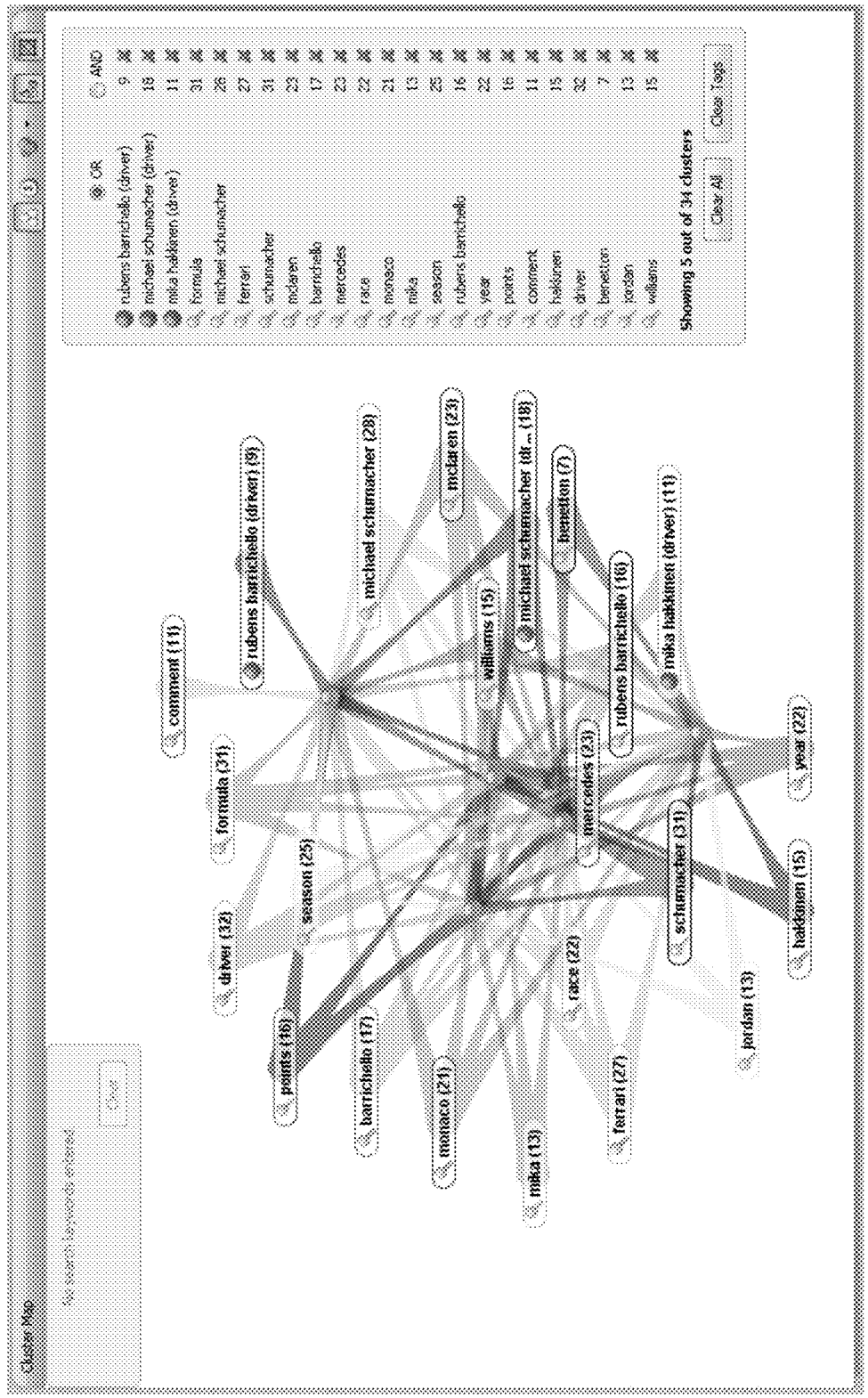
Figure 25:
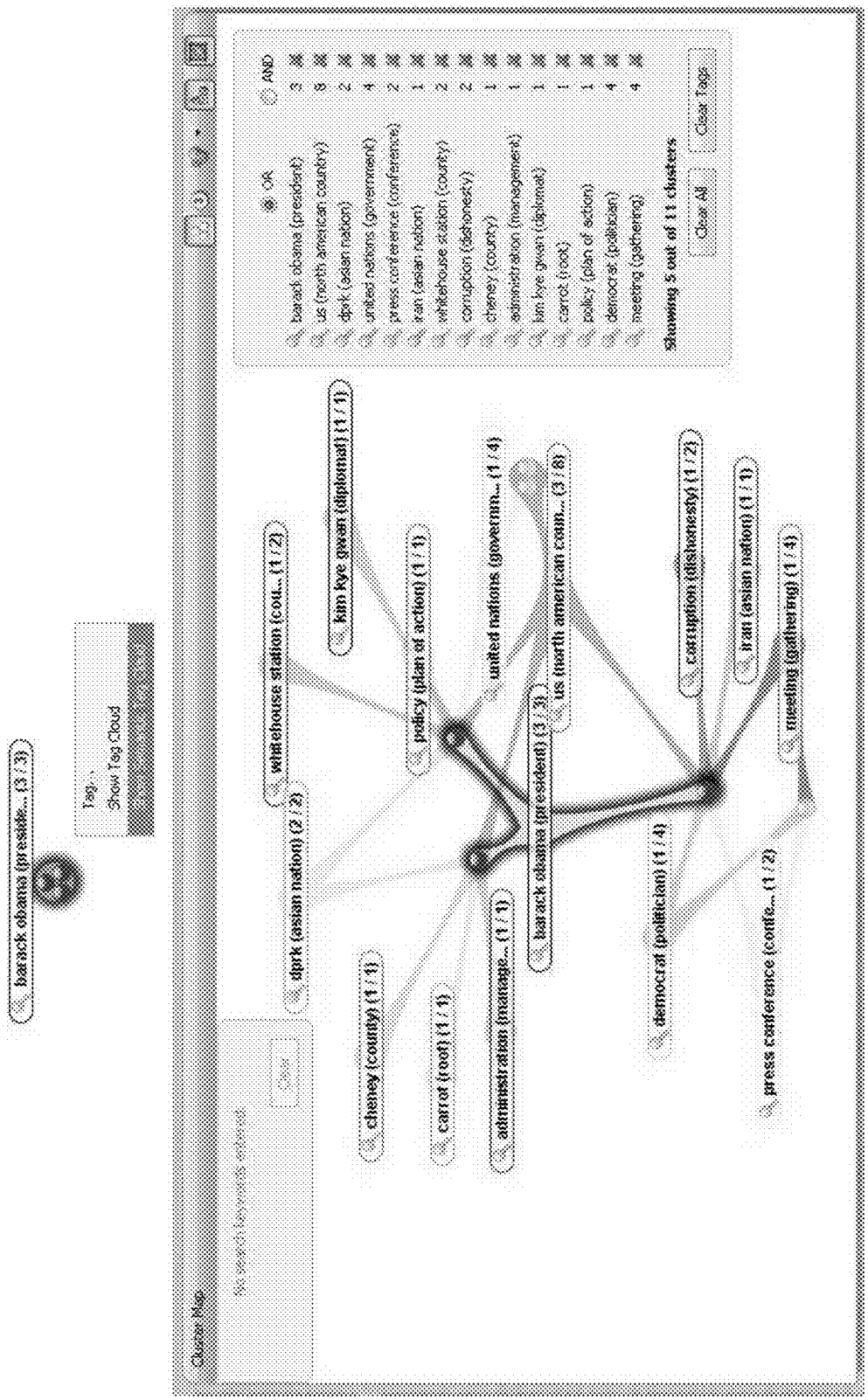
Figure 26:
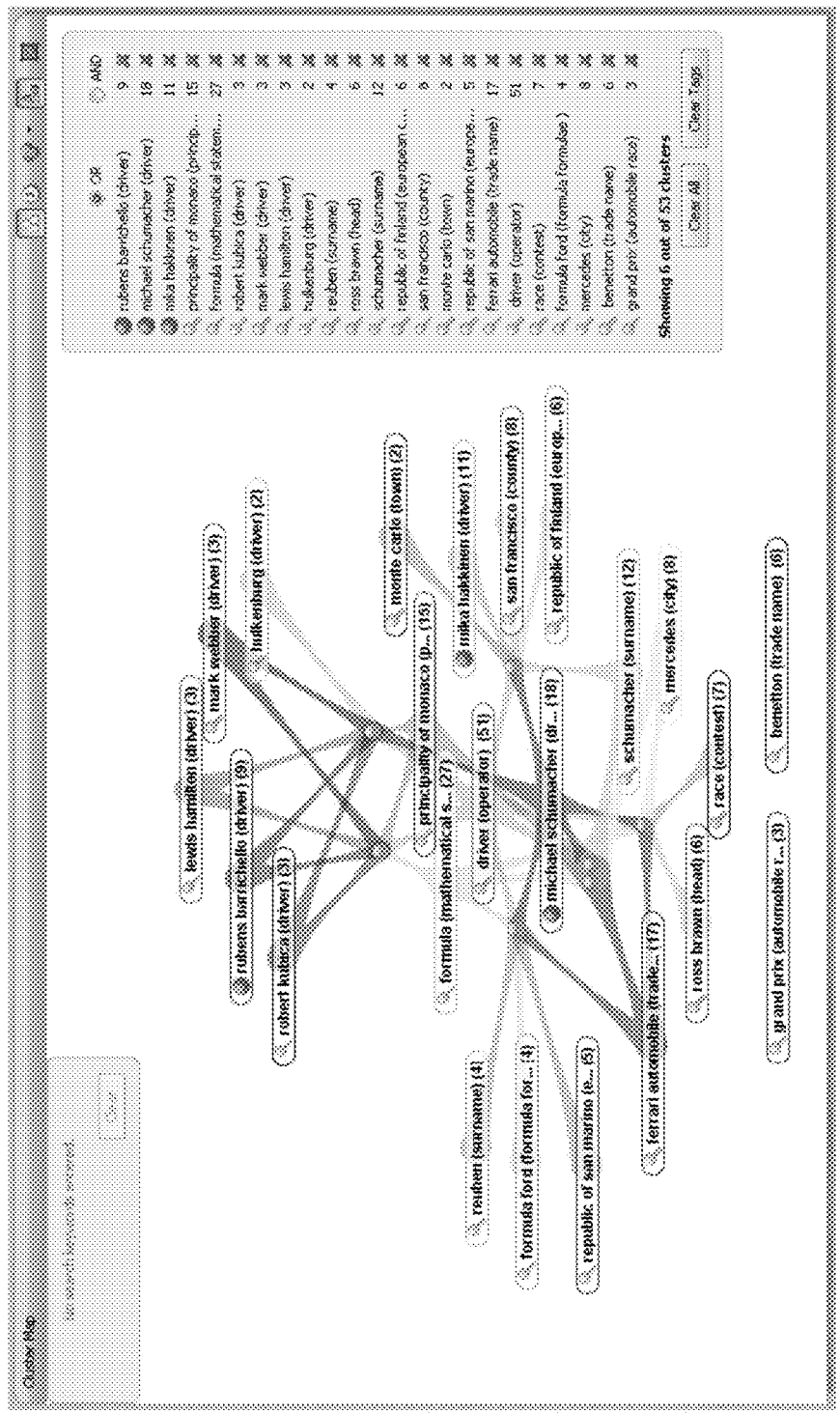
Figure 27:
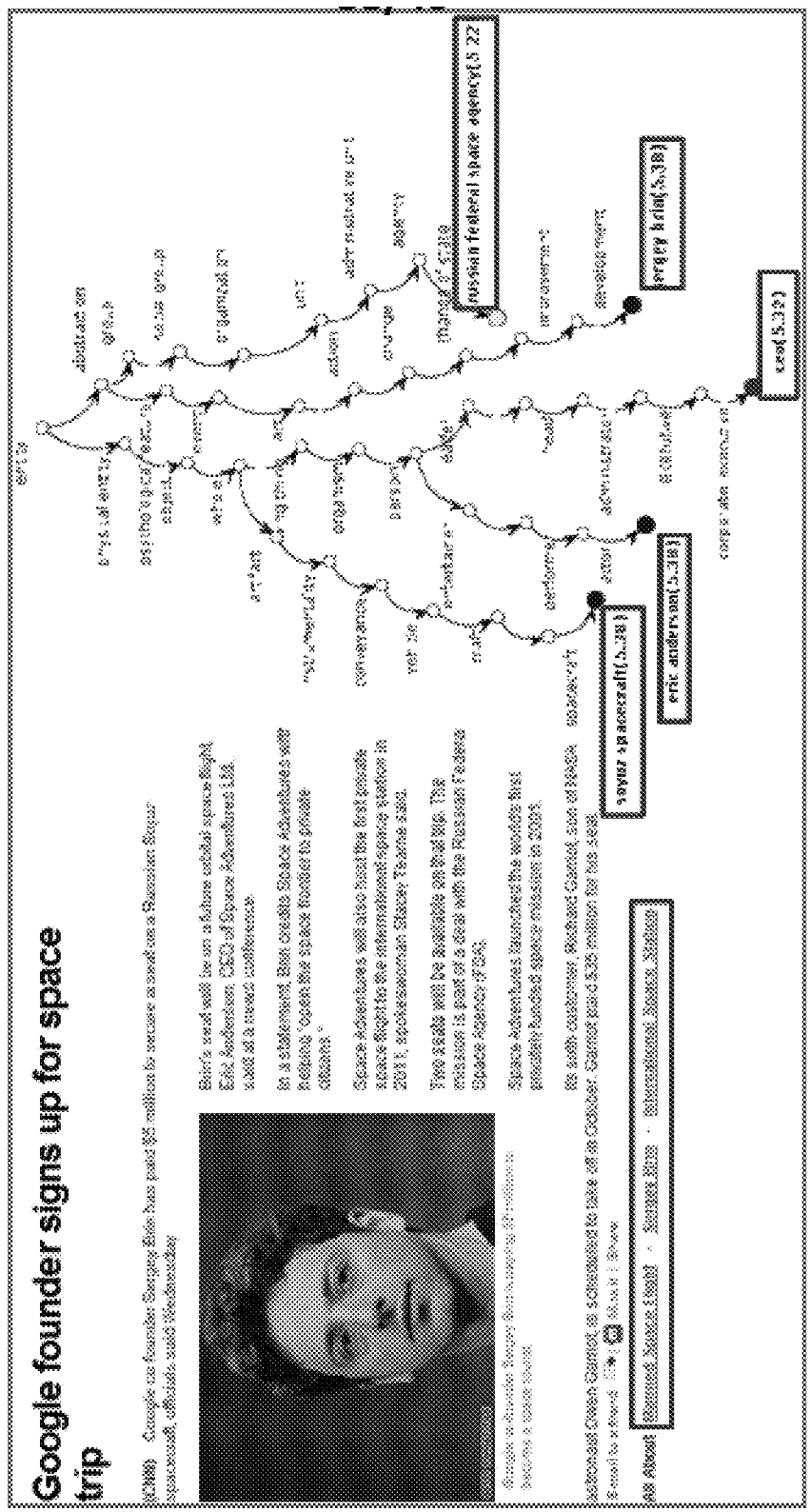
Figure 28:
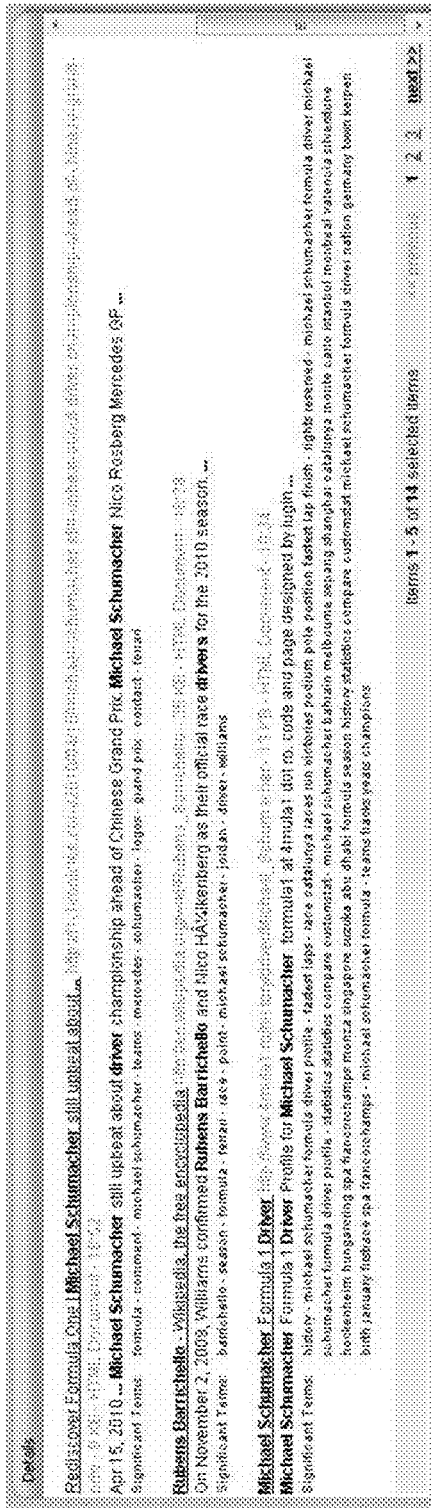
Figure 29:
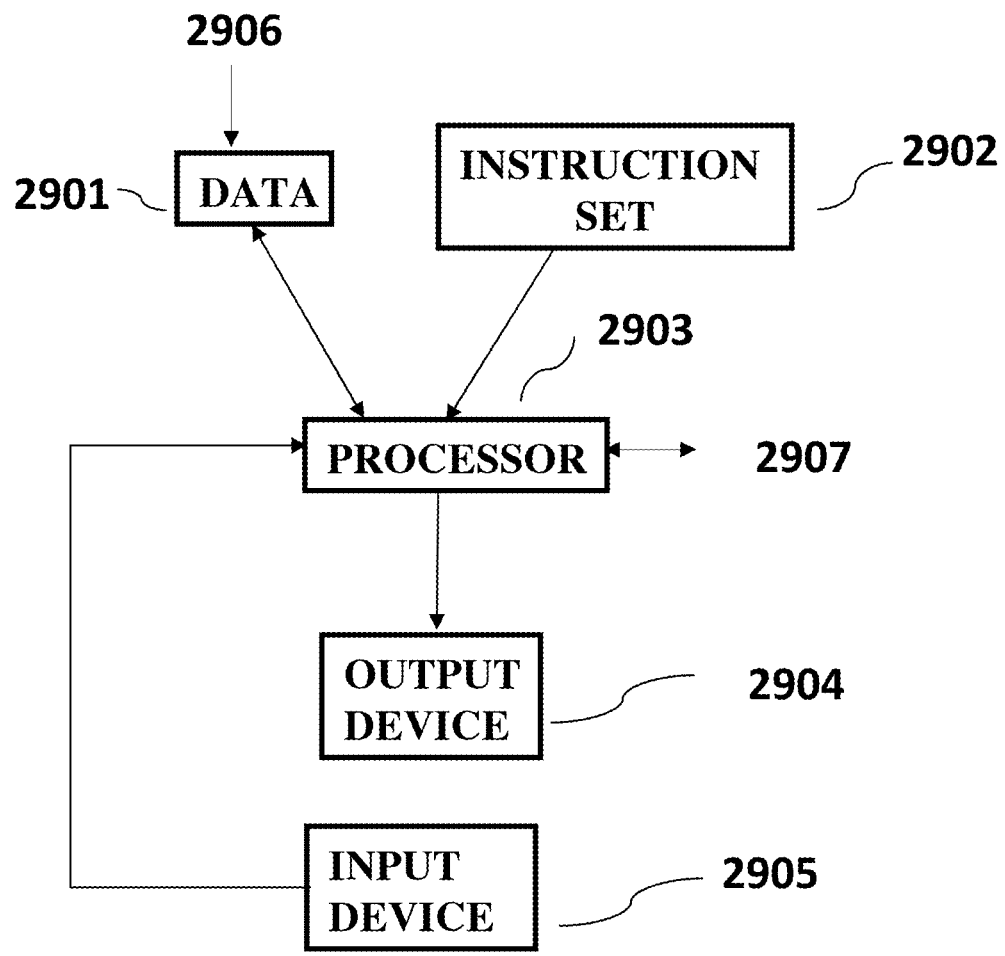

FIG. 1 is an exemplary system architecture.
FIGS. 2A, 2B, 2C, 2D and 2E are exemplary automated semantic tagging methods.
FIG. 3 is an exemplary hypernym based lexical chain.
FIG. 4 is an exemplary domain based lexical chain.
FIG. 5 is an exemplary holonym based lexical chain.
FIG. 6 is an exemplary category based lexical chain.
FIGS. 7A and 7B illustrate an exemplary text news article and an exemplary list of extracted key-phrases from the news article.
FIG. 8 is an exemplary user configuration tool screen view.
FIG. 9 is an exemplary table of part-of-speech tags def in the Penn Treebank tagset.
FIG. 10 is an exemplary table comparing Precision, Recall and F-measure values for the sense mapping algorithms over the SemCor data set.
FIG. 11 illustrates a semantic content tagging and search process in accordance with an aspect of the present invention.
FIG. 12 illustrates an example of a semantic tagging.
FIG. 13 illustrates a conceptual architecture of the Semantic Knowledge Management Tool (SKMT) in accordance with an aspect of the present invention.
FIG. 14 illustrates auto complete field lists defined meanings in accordance with an aspect of the present invention.
FIGS. 15A, 15B, 15C and 15D illustrate aspects of a semantic and keyword based search example in accordance with various aspects of the present invention.
FIG. 16 illustrates an example of a semantic and keyword based search in accordance with one or more aspects of the present invention.
FIG. 17 illustrates an example of a semantic search using parent and child semantic properties in accordance with one or more aspects of the present invention.
FIG. 18 illustrates a system architecture in accordance with one or more aspects of the present invention.
FIGS. 19A, 19B, 19C and 19D illustrate aspects of a graphical user interface provided in accordance with various aspects of the present invention.
FIG. 20 illustrates a semantic search interface provided in accordance with an aspect of the present invention.
FIG. 21 illustrates a repository provided in accordance with an aspect of the present invention.
FIG. 22 illustrates a Facets Interface provided in accordance with an aspect of the present invention.
FIG. 23 illustrates a Cluster Map provided in accordance with an aspect of the present invention.
FIG. 24 illustrates a Cluster Map provided in accordance with an aspect of the present invention.
FIG. 25 illustrates yet another Cluster Map provided in accordance with an aspect of the present invention.
FIG. 26 illustrates yet another Cluster Map provided in accordance with an aspect of the present invention.
FIG. 27 illustrates a comparison of author provided tags with semantic tag cloud generated by the web service provided in accordance with an aspect of the present invention for a given CNN article.
FIG. 28 illustrates a Details Panel provided in accordance with an aspect of the present invention.
FIG. 29 illustrates a processor based system in accordance with at least one aspect of the present invention.

DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions that perform automated semantic tagging that maps text content to entities defined in an ontology. Embodiments use a linear time O(n) lexical chaining WSD algorithm for the mapping process. The lexical chaining algorithm disambiguates terms based on several ontological features. After the mapping process, significance of semantic tags within the content is calculated using statistical and ontological features. Embodiments may be deployed as software as an application program tangibly embodied on a program storage device. The application code for execution can reside on a plurality of different types of computer-readable media known to those skilled in the art.

By adopting UNipedia or other ontologies as the tagging ontology, embodiments produce semantically linked tags for a given text content. These semantic tags can be used to improve enterprise content management and search for better knowledge management and collaboration. As a domain-independent ontology, UNipedia is used for general content tagging purposes. For domain-specific content and applications, embodiments can also be used to map text content to entities defined in domain-specific ontologies.

Figure 2:
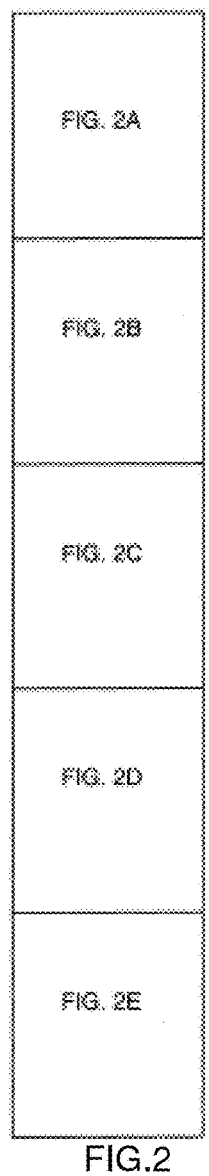

FIG. 1 shows a system architecture 101 and FIG. 2 shows a method. The system architecture 101 comprises a semantic tagging engine 103 and a Graphic User Interface (GUI) 105. The semantic tagging engine 103 analyzes a given text content and assigns ontological entities and weights them using semantic and statistical features. The GUI 105 allows for user configuration and testing. With it users can tune the tagging engine 103 algorithm parameters and visualize weighted semantic tags in semantically connected graphs.

The tagging engine 103 comprises three modules, a noun phrase extraction module 107, an ontology mapping module 109 and a concept weighting module 111. The tagging engine 103 can receive textual content as input (step 201 in FIG. 2A). The input can vary from one paragraph of content to text documents in a file system. The noun phrase extraction module 107 parses the raw text input and passes noun phrases to the ontology mapping module 109. The ontology mapping module 109 maps the noun phrases to an ontology, such as UNipedia 113. It performs two functions: (1) phrase mapping and (2) sense mapping. The concept weighting module 111 weights semantic concepts output from the ontology mapping module 109 using statistical and ontological features.

Nouns usually best describe what content users are interested in, such as books, musicians, movies, actors, etc. For tagging, nouns are used to describe content and its context. Noun extraction is an important step of semantic tagging since it affects tagging quality. The noun phrase extraction module 107 uses Natural Language Processing (NLP) Application Programming Interfaces (APis) that include OpenNLP API MINIPAR (step 203 in FIG. 2A). OpenNLP is an organization for open source NLP projects and provides open source NLP methods. MINIPAR is a broad-coverage parser for the English language. Algorithms use some basic NLP functions from them. OpenNLP API and MINIPAR provide equal functionality in this case. Embodiments use both NLP APis. Users can switch between them using the GUI 105. The pseudocode of the noun phrase extraction module 107 is provided as set (1) in paragraph [0053] of parent application U.S. patent application Ser. No. 13/018,462 filed on Feb. 1, 2011, which is incorporated herein by reference and where the preProcess function (step 204 in FIG. 2A) removes all characters other than alphabetical and grammatical punctuation marks. Punctuation marks are used for sentence identification. Numerical expressions (i.e., money, percentage and years) are filtered after the preProcess function.

Sentence detection, tokenizing and tagging are functions provided by NLP APis.

The sentenceDetection function (step 205 in FIG. 2A) splits given content into sentences.

Figure 2A:
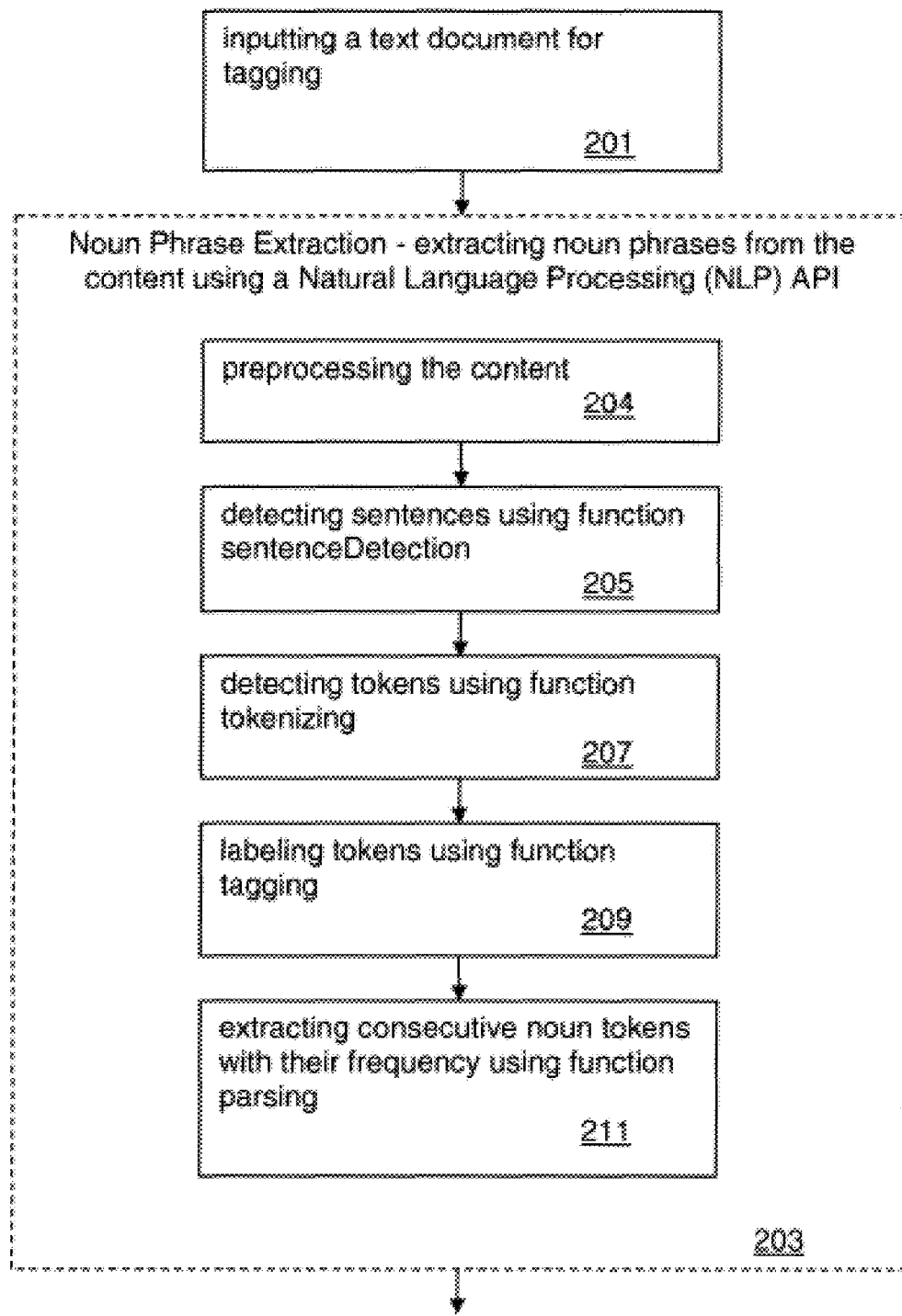
Figure 2B:
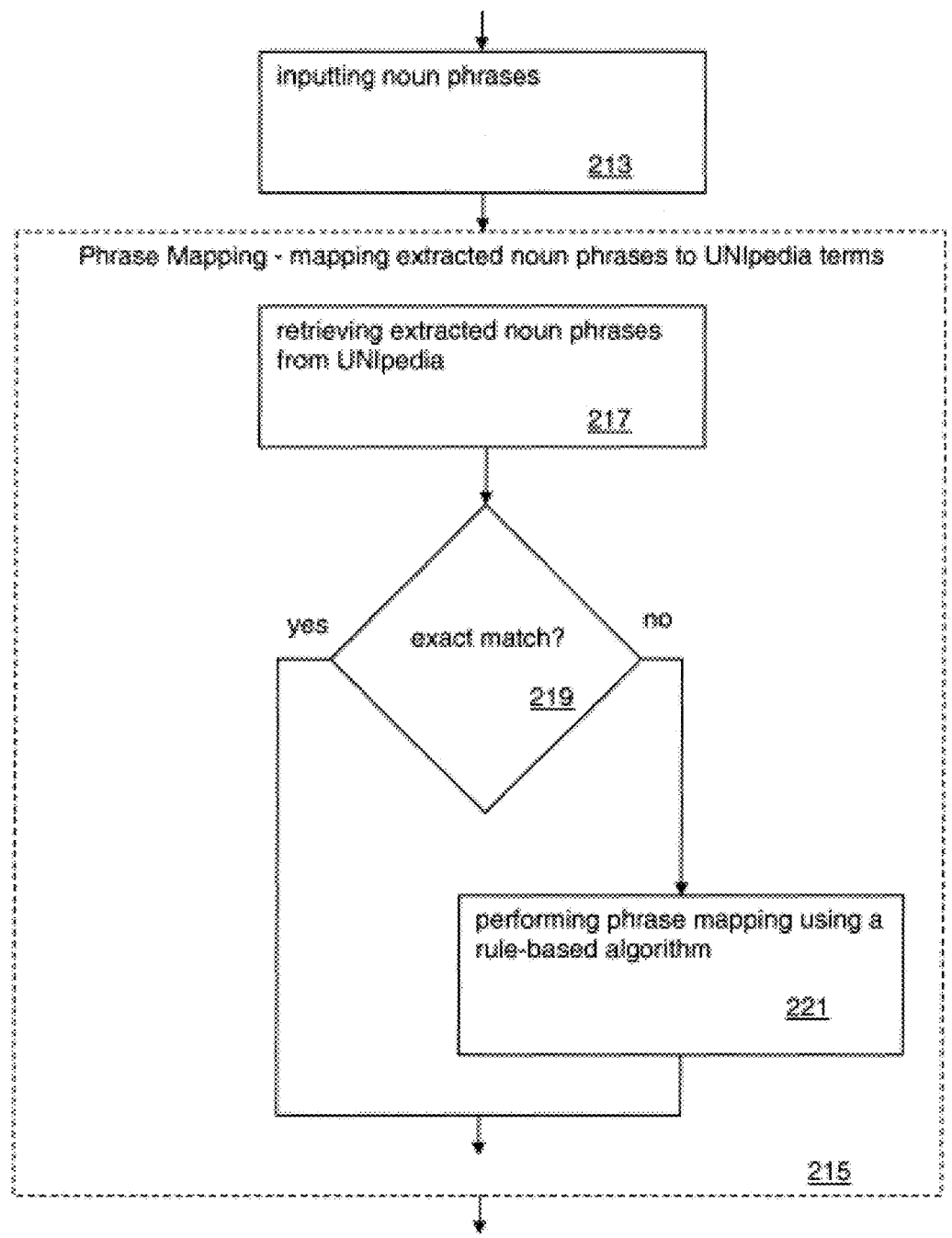

The tokenizing function further splits the detected sentence into tokens (words) (step 207 in FIG. 2A). Tokenizing can not be handled by detection of the space character. A tokenizer is required to split words that are contractions (e.g., doesn't).

The tagging function labels the extracted tokens with a part-of-speech such as noun, verb, adverb, etc. (step 209 in FIG. 2A). The types of tags are listed in FIG. 9. Noun phrases are consecutive noun tokens tagged as NN, NNP, and NNPS. They are extracted with their occurrence frequency (step 211 in FIG. 2A). Some noun phrases comprise a definite article plus a noun (e.g., the White House).

The parsing function is presented as the inner for-loop in (1). The parsing function finds some noun phrases, instead of all kinds of noun phrases by adopting the chunking function from NLP APis. The chunking function assigns part-of-speech tags to the extracted tokens.

FIG. 9 shows a list of possible part-of-speech tags and their description. Not all kinds of noun phrases are suitable for content tagging. Human or content tagging systems tend to use named entities for content tagging purposes. Therefore, the noun phrase extraction module 107 extracts entities or named entities. For example, given a sentence, OpenNLP identifies "a rare black squirrel, a regular visitor and a suburban garden" as noun phrases. These noun phrases are not suitable as entities from an ontology. In contrast, squirrel, visitor and garden would be extracted as noun phrases using (1).

The pseudocode of key-phrase extraction (steps 215, 217, 219 and 221 in FIG. 2B) is provided as set (2) in paragraph [0064] of parent application U.S. patent application Ser. No. 13/018,462 filed on Feb. 1, 2011, which is incorporated herein by reference. This step is preceded by inputting noun phrases, shown in step 213 in FIG. 2B.

Plurality is another problem when mapping to the ontology. In certain cases, plurality causes mapping problems. For example, "Siemens" is a company and would be stemmed to "Siemen" which would be a wrong conversion. Therefore, (2) queries both the stemmed and the original forms of noun phrases. If both are defined, the original form of the noun phrase is chosen.

Word Sense Disambiguation (WSD) is an open problem of natural language processing, which comprises the method of identifying which sense of a word (i.e., meaning) is used in any given sentence when the word has a number of distinct senses (polysemy). In UNipedia, terms may have several senses, each of which is a UNipedia concept. These polysemous terms receive different means according to their context. As the outcome from the previous step, noun phrases can not be mapped to UNipedia terms directly if these terms are polysemous. Instead, WSD algorithms map them to the correct UNipedia senses.

Embodiments use developed lexical chaining algorithms with different ontology features to overcome the disambiguation problem. The algorithms used in embodiments improve mapping accuracy.

Semantically related words are connected to each other and form a set of lexical chains which show cohesions through the content. A linear time O(n) lexical chaining algorithm that adopts the assumption of one sense per discourse is used for the WSD task. One sense per discourse assumes that a word generally retains its meaning across all its occurrences in a given discourse. For mapping to the appropriate meaning, the ontology mapping module 109 examines the context of documents by forming lexical chains.

In the ontology mapping module 109 (step 223 in FIG. 2C), the ontological properties hypernym, domain, category and holonym are used to create lexical chains. For each feature, a lexical chaining algorithm is applied separately to create four different sets of chains. Therefore, each feature's contribution to the WSD can be observed, and further explorations and improvements may be performed.

The hypernym relation forms the taxonomy of an ontology. It defines an is A relationship between concepts. For example, the concept person is a hypernym (or parent) of the concept scientist.

The hypernymy mapping algorithm (step 225 in FIG. 2C) runs in linear time O(n). Given a set of senses, each sense is connected to its parent sense. In this way, senses are not compared with each other and are instead connected to each other with common ancestors to form lexical chains. When one sense is connected, it increases WSD scores of its ancestor senses until reaching a predetermined threshold of ancestor distance. Then each sense is assigned a WSD score by summation of its ancestor senses' WSD scores.

The pseudocode of the hypernym mapping algorithm is provided as set (3) in paragraph [0072] of parent application U.S. patent application Ser. No. 13/018,462 filed on Feb. 1, 2011, which is incorporated herein by reference.

The hypernym mapping algorithm (3) receives a set of noun phrases and corresponding senses as an input, and creates lexical chains using an ontology such as UNipedia. The algorithm has two phases. First, each sense has an initial WSD score of zero. Once it is connected, it increases WSD scores of their ancestor senses until reaching a predetermined threshold of ancestor distance. Senses also increase their WSD scores to contribute to WSD scores of their child senses.

In the second phase, senses increment their WSD scores by adding WSD scores of their ancestor senses. In this way, senses that have more common ancestors with other senses receive higher WSD scores.

Finally, senses which receive the highest WSD scores among the phrases' senses are selected for the extracted noun phrases.

Considering cases in which senses derived from the same phrase have different parent senses, and these parent senses may have a common ancestor. These scenarios create lexical chains composed of senses derived from the same phrase, although they are not supposed to appear in the same lexical chain. To solve this issue, WSD scores added by a sense itself and senses that have common sense names are subtracted. In addition, one sense can be derived from multiple phrases. In these cases, a sense earns an extra WSD score of the number of its synonyms.

The sense scoring formula is defined as $$S(c) = \sum_{n=1}^{N} \frac{1}{\text{distance}(c, child_{n_c})}, \text{ and} \quad (4)$$

$$\text{hypernym}(c) = \sum_{n=1}^{M} S_n - S_{n_c} + \text{synonym}(c) \quad (5)$$

where the S(c) function calculates the score of a given concept c, N is the number of child senses that pass through the context of concept c, hypernym(c) is the hypernym WSD score for a given concept c, is the hypernym WSD score of the $n^{th}$ ancestor of a concept, is the score added by a concept and concepts sharing the same name to the $n^{th}$ ancestor, M equals the maximum ancestor distance constant and synonym(c) returns the number of synonyms of a concept.

Senses that have a higher number of connected senses in the lexical chains, receive a higher WSD score and these senses form the context. Therefore, the hypernym algorithm maps a phrase to a sense, which receives a higher WSD score than the phrase's other senses.

FIG. 3 shows a hypernym based lexical chain 301 created by the hypernym mapping algorithm (3) with Programming Language, Java and Prolog as noun input phrases. The meanings of the noun phrases are defined below. The superscript and subscript denote the word's sense rank and part-of-speech tag, respectively. In FIG. 3, the solid (black) nodes represent selected senses by the lexical chaining algorithm. Grey nodes are senses will be ignored after the WSD step. The open (white) nodes represent ancestors of senses. Parenthetical numbers represent the calculated WSD scores of senses.

$$\text{ProgrammingLanguage} = \{prog.lang._n^1 \text{ (a language ...)}\}. \quad (6)$$

$$\text{Java} = \begin{cases} Java_n^1 \text{ (an island in Indonesia ...)} \\ Java_n^2 \text{ (a beverage ...)} \\ Java_n^3 \text{ (a programming language ...)} \end{cases}, \text{ and} \quad (7)$$

$$\text{Prolog} = \{Prolog_n^1 \text{ (a computer language)}\} \quad (8)$$

The hypernym mapping algorithm (3) maps Java to its third, and Programming Language and Prolog to their first meanings. Because, these meanings have a common ancestor of Programming Language within a defined maximum ancestor distance. Other meanings do not have common or closer ancestors. The hypernym mapping algorithm (3) gives higher WSD scores to specific senses (defined in higher depths) and senses that have closer ancestor senses within a given content. Therefore, Prolog receives the highest WSD score for the given input phrases.

The domain (topic) is another semantic relation that groups concepts to different topics.

The domain mapping algorithm (step 227 in FIG. 2C) creates lexical chains using the domain property of senses. Senses within the same domain are connected via the domain node. They are not directly connected to each other. Given a set of noun phrases and their senses, they will form several lexical chains. Each chain has a domain node and several sense nodes. Within a chain, the score of each node including the domain node is equal to the size of the chain how many nodes in the chain except the domain node. Then, the domain algorithm maps a noun phrase to a sense that receives the highest WSD score among all senses of the noun phrase. The pseudocode of the domain mapping algorithm is provided is provided as set (9) in paragraph [0088] of parent application U.S. patent application Ser. No. 13/018,462 filed on Feb. 1, 2011, which is incorporated herein by reference.

FIG. 4 shows a domain based lexical chain 401 created by the domain mapping algorithm (9) (step 227) with Java and Ontology as noun input phrases. The meanings of Ontology are defined below. The domain mapping algorithm maps Java to its third and Ontology to its first meanings because the selected senses are defined under the computer science domain and other senses do not have a common domain relationship.

$$\text{Ontology} = \left\{ \begin{array}{l} Ontology_n^1 (\text{organization of knowledge} \ldots ) \\ Ontology_n^2 (\text{study of the nature of being} \ldots ) \end{array} \right\} \quad (10)$$

The holonym relation defines hasPart relationships between concepts. For example, the concept wheel is a holonymy (part of) of the concept car. In a holonym based lexical chaining approach, senses are connected with each other if there is a holonym relationship between them. Senses are also connected, if they have common holonym property. For example, both car and bus have part of wheel. Therefore, bus and car are connected to the same lexical chain. When forming chains, only the first degree holonym relationships are considered. For example, molecule has parts of atom and atom has parts of nucleus. The nucleus and molecule concepts would not be connected in a lexical chain because they do not have a direct holonym relationship. Senses in a lexical chain receive a WSD score representing the number of senses in the chain. The holonym algorithm maps a phrase to a sense, which receives a higher WSD score than the phrase's other senses (step 229 in FIG. 2C).

The holonym mapping algorithm creates lexical chains using the holonym property of senses. In this algorithm, senses that have common holonym concepts are connected with each other. Senses may have multiple holonym concepts and may connect to multiple lexical chains. A sense receives a WSD score of a summation of a number of concepts in its connected chains. Then, the holonym algorithm maps a noun phrase to a sense that receives the highest WSD score among all senses of the noun phrase. The pseudocode of the holonym mapping algorithm is provided as set (11) in paragraph [0093] of parent application U.S. patent application Ser. No. 13/018,462 filed on Feb. 1, 2011, which is incorporated herein by reference.

FIG. 5 shows a holonym based lexical chain 501 created by the holonym mapping algorithm (11) with Java and Coffee Bean as noun input phrases. The meanings of Coffee Bean are defined below. The holonym mapping algorithm maps Java to the second and Coffee Bean to the first meanings because of the part of relationship (holonym) between the two phrases. Other meanings do not have a common part of relationship.

$$\text{Coffee Bean} = \{ \text{Coffee Bean}_n^1 (\text{a seed of the coffee} \ldots ) \} \quad (12)$$

Most ontologies categorize their concepts. For example, every wordNet concept has a category. These are categories such as food, action, person, etc. Senses from the same category form a lexical chain, and they are scored as a number of senses in the chain. A category algorithm maps a phrase to a sense, which receives a higher WSD score than the phrase's other senses (step 231—FIG. 2C).

The category mapping algorithm creates lexical chains using the category property of senses. In this algorithm, senses within the same category are connected via a category node. They are not directly connected to each other. Given a set of noun phrases and their senses, they will form several lexical chains. Each chain has a category node and several sense nodes. Within a chain, the WSD score of each node including the domain node is equal to the size of the chain—how many nodes in the chain except the category node. Then, the category mapping algorithm maps a noun phrase to a sense that receives the highest WSD score among all senses of the noun phrase. The pseudocode of the category mapping algorithm is provided as set (13) in paragraph [0098] of parent application U.S. patent application Ser. No. 13/018,462 filed on Feb. 1, 2011, which is incorporated herein by reference.

FIG. 6 shows a category based lexical chain 601 created by the category mapping algorithm (13) with Java and Jakarta as noun input phrases. The meaning of Jakarta as a concept is defined below. The category mapping algorithm maps Java and Jakarta to their first meanings Because both of the senses are defined under the location category and other meanings do not have a common category relationship.

$$\text{Jakarta} = \{ \text{Jakarta}_n^1 (\text{capital and largest city of Indonesia}) \} \quad (14)$$

The Sense Rank algorithm maps noun phrases to the highest ranked sense from all of its meanings as defined in UNipedia (step 233). Also, senses are scored using $$\text{Rank}(c) = \frac{1}{r_c} \quad (15)$$

where the Rank(c) function is the rank score for a given concept c and is the sense rank of the concept in WordNet.

The SUM algorithm (16) is provided as set (16) in paragraph [0106] of parent application U.S. patent application Ser. No. 13/018,462, is a weighted summation of normalized WSD scores from the hypernym (17) is provided as set (17) in paragraph [0107] of parent application U.S. patent application Ser. No. 13/018,462, which is incorporated herein by reference.

Domain (18) is provided as set (18) in paragraph [0108] of parent application U.S. patent application Ser. No. 13/018,462; holonym (19) is provided is provided as set (19) in paragraph [0109] of parent application U.S. patent application Ser. No. 13/018,462; and category (20) mapping algorithms is provided as set (20) in paragraph [0110] of parent application U.S. patent application Ser. No. 13/018, 462 filed on Feb. 1, 2011, which is incorporated herein by reference, (steps 235, 237, FIG. 2C). Weights (coefficients) are calculated based on the performance of each algorithm.

In addition to ontological properties, the SUM+ algorithm takes statistical data of sense rank into consideration. As defined below, it is formulated as the summation of normalized WSD scores from the holonym, domain, hypernym and category 3 mapping algorithms and the sense score from the Sense Rank algorithm with different weights (step 239, FIG. 2C). The pseudocode of the SUM+ algorithm is provided as set (21) in paragraph [0112] of parent application U.S. patent application Ser. No. 13/018,462 filed on Feb. 1, 2011, which is incorporated herein by reference.

Figure 2C:
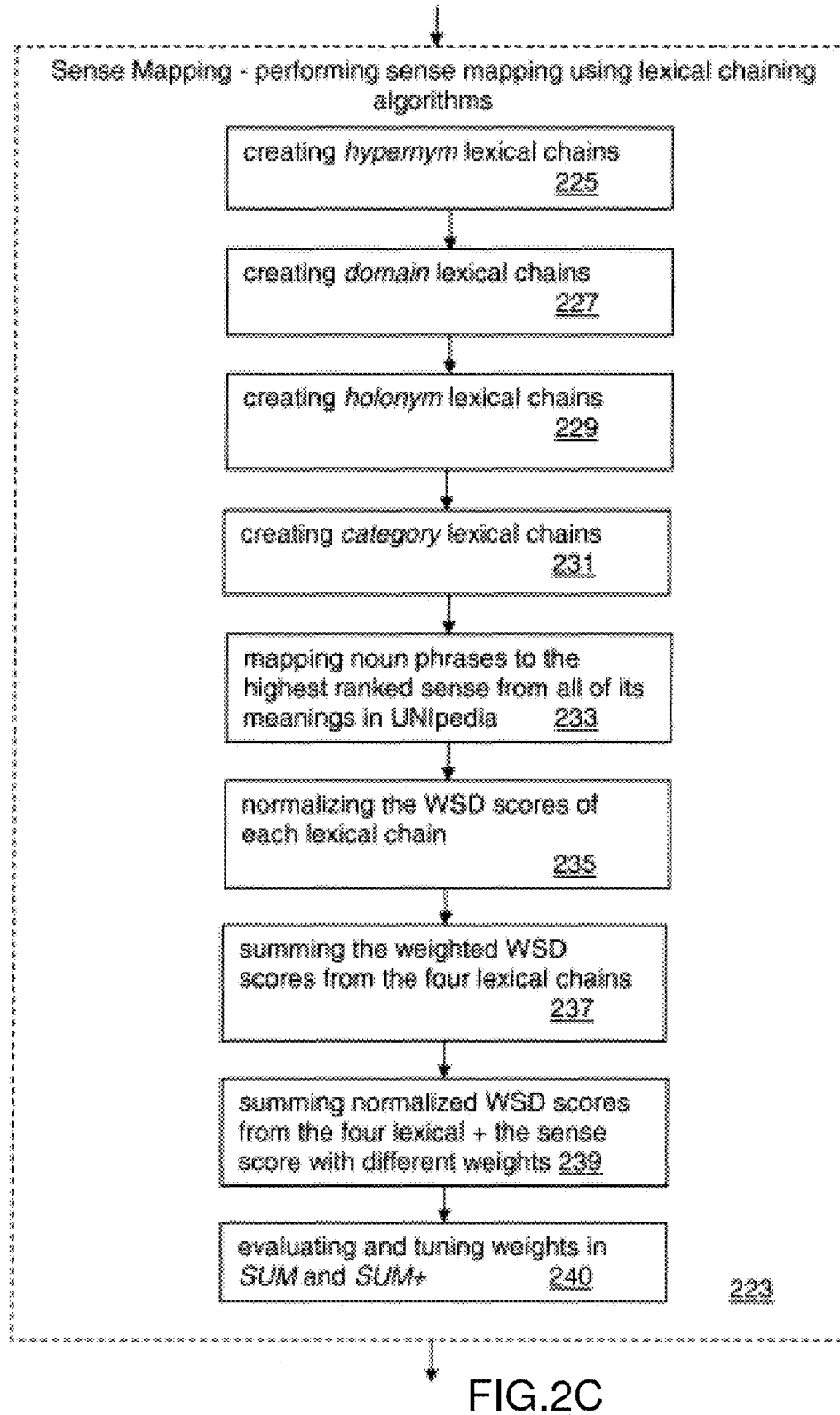

Evaluating and weight tuning uses SemCor as a training data set, compares the performance of different algorithms, and tunes their weights in the SUM (16) and SUM+(21)

algorithms (step 240, FIG. 2C). Then the sense mapping module returns the sense with the highest WSD score for noun phrases using the SUM+ algorithm.

SemCor is a widely used sense-tagged corpus in WSD research. Derived from the manual semantic annotation of the Brown corpus to WordNet senses, SemCor contains 352 documents tagged with approximately 234,000 sense annotations.

The SemCor metrics of Precision, Recall and F-measure are used to measure the performance of the mapping algorithms.

Precision evaluates the rate of correctness of given answers. For the sense mapping algorithm, Precision is calculated by $$\text{Precision} = \frac{\text{\# true sense mappings}}{\text{\# all sense mappings}} \quad (22)$$

Recall is a measure of the coverage performance of a system. For the sense mapping algorithm, Recall is calculated by $$\text{Recall} = \frac{\text{\# true sense mappings}}{\text{\# all noun phrases}} \quad (23)$$

F-measure evaluates the overall performance of a system. F-measure is calculated by $$F\text{-measure} = \frac{2 \times \text{Precision} \times \text{Recall}}{\text{Precision} + \text{Recall}} \quad (24)$$

FIG. 10 shows the Precision, Recall and F-measure of the hypernym, domain, holonym, category, Sense Rank, SUM and SUM+ algorithms based on the SemCor data set.

The category and domain mapping algorithms performed worse than the hypernym and holonym mapping algorithms, because categories are high level senses, which can not give enough information to disambiguate terms. Corresponding senses of a word can receive the same category value that decreases the recall of a chaining algorithm. The domain mapping algorithm suffers from low coverage (Recall). Only 8% of WordNet concepts have a defined domain relation. WordNet is limited in terms of domain and category relationships for disambiguating words in a context.

The hypernym mapping algorithm performed better than the other chaining algorithms in terms of Recall and F-measure, for the reason that hypernymy relations of senses are well defined in WordNet.

In this case, the Sense Rank algorithm performed better than the SUM+ algorithm because sense ranks are calculated based on a corpus and the test data is a sample from that corpus and only contains concepts defined in WordNet. For example, the sense Java island has the highest sense in WordNet. But when Java is searched using Google, the top web pages found are about the programming language Java. These sense ranks are not valid for web corpus. In addition, only concepts defined in WordNet have sense ranks. Most other ontology concepts do not have sense ranks.

In contrast, the SUM+ algorithm considers sense rank once it is available, otherwise the SUM+ algorithm finds the context of documents through other lexical chains.

Four different types of lexical chains are created separately in order to observe individual performances and decide which features to use in the WSD algorithm. The performance of the above algorithms gives clues about their coefficients in the SUM and SUM+ algorithms. Hypernym with the highest Recall and holonym with the highest Precision performed better than other algorithms in experiments. When the two lexical chains are combined, system performance increases to an F-measure value of 54.50% which is better than using hypernym or holonym alone. Since holonym has a very high Precision compared to others, better performance (54.77% F-measure) is observed when its weight is increased. On the other hand, the category and domain algorithms decreased the performance of the SUM and SUM+ algorithms.

When statistical feature sense ranks are used, performance increases significantly. It is because these sense ranks are calculated based on a corpus and the test data is a sample from that corpus and only contains concepts defined in WordNet.

The holonym mapping algorithm has the highest Precision value compared to the other three mapping algorithms. And it has the highest coefficient in the SUM and SUM+ algorithms. Different coefficient combinations are tried to maximize the performance of the SUM algorithm. Then, the SUM+ algorithm is evaluated using lexical chain coefficients that maximize the SUM algorithm with varying Sense Rank algorithm coefficients.

From (21), the hypernym, domain, holonym, category, and Sense Rank algorithms are specific cases of the SUM+ algorithm. The SUM+ algorithm can be applied with or without training data sets. With a training data set, a learning algorithm may be used such as multiple Kernel SVMs to learn the coefficients. With no training data set, the SUM+ algorithm can be used as a summarization of the hypernym and holonym algorithms as described above. Embodiments perform better than most mapping algorithms. Linear time O(n) lexical chaining algorithms are preferred for sense mapping for three reasons. First, it is desired to map concepts in real-time with a computation efficient approach, which has less computational complexity. Second, the lexical chaining approach gives information to rank and finds significant phrases. And third, it is desired to extract metadata without depending on any domain. Supervised systems require extensive annotated data that includes annotated data from all domains which is impracticable to acquire and process.

The concept weighting module 111 first weights semantic concepts by their Term Significance (TS) scores then returns key-phrases as semantic tags for the text input according to their TS scores.

Key-phrases (tags} can describe the content of a document, a web page, or a website. Key-phrases gain more popularity because they can be used to attract readers and improve search results. Since manually assigning key-phrases is expensive and time consuming, the majority of documents do not have associated key-phrases, thus automatic extraction techniques would be very useful for information retrieval and content management purpose.

Most existing key-phrase extraction algorithms only rely on statistical information which returns low performance. To improve performance, embodiments use semantic analyses to understand the context of content before key-phrases are extracted (step 241—FIG. 2D). Moreover, the key-phrases are semantic tags. These tags have formally defined senses and explicit semantic links to an ontology. Therefore, these key-phrases provide an efficient and meaningful representation of text to human users. Meanwhile, the key-phrases allow computers to understand and further exploit their semantics and semantic relationships for matching, comparing, and reasoning on textual data.

Embodiments implement a key-phrase extraction technique that computes TS scores of concepts using both ontological and statistical features. Specifically, TS scores are calculated with both semantic and statistical information (step 243, 245, FIG. 2D). Semantic information includes lexical chaining WSD scores derived from the WSD phrase, and Depth and Information Content (IC) values of a concept. Statistical information includes the Term Frequency (TF) and Inverse Google Popularity (IGP) values. The pseudocode for the weighting and combining scores algorithm is provided as set (25) in paragraph [0135] of parent application U.S. patent application Ser. No. 13/018,462 filed on Feb. 1, 2011, which is incorporated herein by reference.

IC values of concepts are derived using the taxonomic structure of an ontology formed by hypernym relations. IC values measure how much information a concept expresses. Information Content is calculated by $$IC(c) = 1 - \frac{\log(\text{Child}(c) + 1)}{\log(\max_{wn})} \quad (26)$$

where the Child(c) function returns the number of concepts that have ancestor concept c. $\max_{wn}$ is a constant of the number of concepts that exist in an ontology. (26) returns values between a range of 0-1: leaf node concepts earn IC values of 1 while the root concept has an IC value of 0.

Google Popularity is a statistical value that represents the occurrence probability of a term in the collection of web pages indexed by the Google search engine (step 245). Google Popularity (GP) is $$GP(c) = \frac{\log f(c)}{\log M}, \text{ and} \quad (27)$$

Inverse Google Popularity (IGP) is $$IGP(c) = 1/GP(c). \quad (28)$$

Figure 2D:
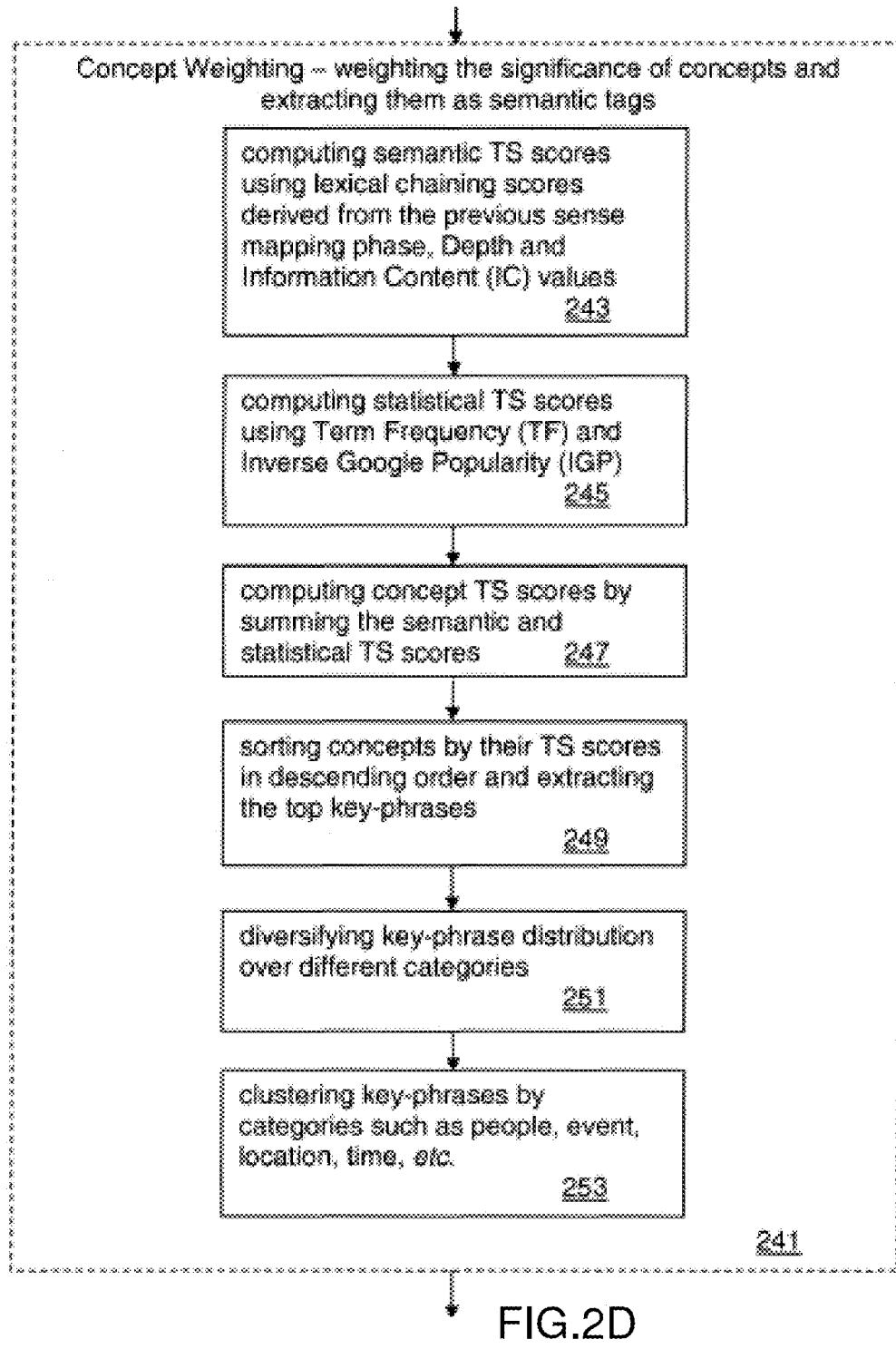
Figure 2E:
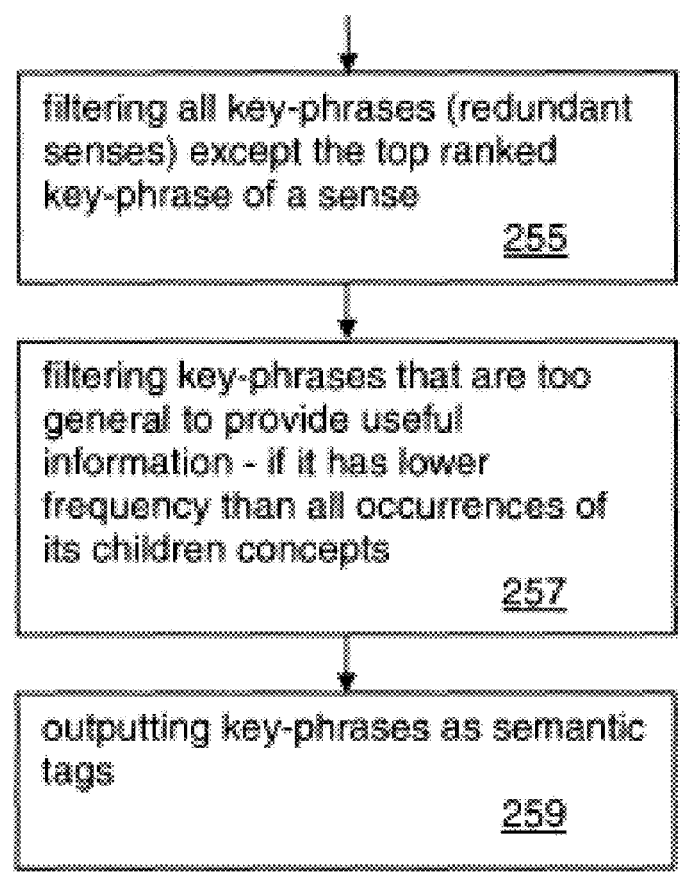

Concept TS scores are computed by combining its semantic TS scores and statistical TS scores (step 247, FIG. 2D). As shown in (25), IGP, Depth and IC values of concepts are used to favor specific phrases, and TF statistical information is used to favor frequently used terms. The WSD scores derived from the category mapping algorithm are not used because category concepts are too general to give much information about term significance. Instead, category information is used to cluster key-phrases and filter tags of certain categories.

After TS score calculation, concepts are sorted by their TS scores in descending order and top concepts are extracted as key-phrases (step 249, FIG. 2D). Heuristics are applied to diversify the key-phrases distribution among different categories. For example, the TS score of a concept will be divided by two after the first occurrence of its category to increase category variety (step 251, FIG. 2D). Then the key-phrases are clustered by their categories. With categories such as people, event, location and time, the key-phrases can serve as recommended semantic tags of content to draw users' attention, improve content management and search (step 253, FIG. 2D).

Since the key-phrases are semantic phrases, some phrases can be mapped to the same sense. In such cases, all key-phrases are filtered except the no. 1 ranked key-phrase of that sense (step 255, FIG. 2E). Sometimes, terms that are too general to provide useful information are filtered. A concept is filtered if it has a lower frequency than all occurrences of its children concepts. For example, Honda, Toyota and BMW are children of the car concept. If all of the phrases appear in a document, the car phrase may be filtered if it has a lower frequency than its children concepts (step 257, FIG. 2E).

FIG. 7A is an exemplary news article extracted from CNN.com and shows author assigned key-phrases and key-phrases created from embodiments. In this example, the system framework 101 is set to return five key-phrases that are sorted in descending order according to their TS scores. The result in FIG. 7B shows key-phrases output that are matched to those of the author. Furthermore, it is clear that author assigned key-phrases do not adequately describe and summarize the content. In general, manual author tagging is subjective, time consuming, and may be poor in quality. It worsens if an author needs to provide more than ten tags. With different parameter settings, embodiments provide an automated semantic tagging approach to address this problem.

FIG. 8 shows a screen view of the Graphic User Interface (GUI) 105 used to run and test different algorithm and parameter settings. The GUI 105 allows users to input a document with title, body and keywords, and then allows the users to change system configuration and algorithm parameters to retrieve the semantic tags in table and graph views.

The GUI has three zones: A top configuration zone 805, a middle text input zone 803, and a bottom output zone 807.

The middle text input zone 803 comprises three text boxes: title, body and keywords. These three fields form the content input for semantic tagging. Title and keywords sections are not required. However, key-phrases from the title or the keywords sections have privileges over the text body. These phrases are not subject to the minimum occurrence limitation.

The top configuration zone 805 enables various parameter settings. To achieve better tagging results, different sense mapping algorithms may run with different parameter settings: different ontologies, mapping algorithms, NLP methods. The concept weighting algorithm can also be tuned by: key-phrase number, maximum ancestor distance, minimum occurrence frequency, node size, graph layouts and graph dimension.

In the top configuration zone 805, the parameters are (from left to right): Ontology, Algorithm, NLP, Max. Tag Number, Graph Node Size, Ancestor Distance, Min. Frequency, Graph Type and Dimension.

Ontology: Embodiments support one or more ontologies such as WordNet and UNipedia, and are extendable with new ontologies. The ontologies may be converted into a knowledge representation model using Lucene index files.

Algorithm: It determines which algorithm(s) is used during the sense mapping phase. As described above, seven algorithms are implemented: category mapping, hypernym mapping, holonym mapping, domain mapping, SENSE RANK, SUM and SUM+.

NLP: OpenNLP or Minipar APis can be selected to extract noun phrases from input text.

Max. Tag Number: The key-phrase number specifies the maximum number of extracted semantic tags from the input text.

Graph Node Size: For each tag node in the output semantic tag graph, node size represents the significance of the tag. This parameter specifies the maximum node size for graph display purposes.

Ancestor Distance: It determines the maximum ancestor distance between two senses to form a chain between them.

Min. Frequency: It is used to filter key-phrases that have been encountered below the specified value in the input text. This is not applied to key-phrases in the Title and Keywords sections. Minimum frequency occurrence may be calculated automatically using $$MinF = \frac{PhraseNum \times \log 10(PhraseNum)}{UniquePhraseNum} - 1 \qquad (29)$$

where the MinF function returns the minimum occurrence frequency for a given text document. PhraseNum is the number of extracted nouns and UniquePhraseNum is the number of extracted unique nouns.

Graph Type: It specifies what ontological property is chosen as the link type of the generated semantic tags graph: Hypernym or Domain.

Dimension: The semantic tag cloud may be visualized in either two or three dimensions.

The output zone 807 shows a table of semantic tags and a graph of semantic tags. The table contains detailed information about semantic tags such as definition, parent concept, frequency, score, etc. The table may be sorted according to each defined field. The graph visualizes the semantic tags as nodes and relationships between tags as graph linkages. Semantic tags derived from UNipedia are colored in the graph. Other property nodes are colored white. As shown in FIG. 8, dark leaf nodes are tags derived from the input text. Node size represents the frequency of concept occurrence. Graph type specifies the source of the graph which can be hypernym or domain properties of concepts in the ontology. Different graph layouts can be chosen to visualize the semantic tags (step 259, FIG. 2E). These layouts include Radial Tree, Balloon, Inverted Self-Organizing Maps (ISOM), Kamada-Kawai (KK), Fruchterman-Reingold (FR), Circle and Spring.

One of the advantages of knowledge based WSD algorithms is that why a sense is selected in a context is visible unlike other supervised or unsupervised WSD algorithms. Once a user enters a text input, selects parameters, and clicks the "Analyze" button, the results are displayed in the output zone 807. The left part of the display shows the retrieved semantic tags along with their detailed information, by which users can further study the result and improve the algorithms. The right part of the display shows the semantic tag graph, which serves as a semantic tag cloud for the user after simplification, or can be saved as the semantic tag print of the text content input for semantic content retrieval, search, comparison, and data integration purposes.

Embodiments perform automated semantic tagging that maps text content to semantic tags. A set of tagging algorithms and a GUI are created for visualization and debugging. With automatically generated semantic tags, content from a heterogeneous source can be easily integrated at a semantic level. Moreover, the tags facilitate semantic content management and search applications with more accurate and meaningful search results and intuitive GUI and navigation.

In accordance with an aspect of the present invention semantic content tagging and search methods and systems are provided. In one embodiment of the present invention (1) further improved automatic tagging is achieved by assigning keywords together with semantic linkages among keywords to documents, which is called Semantic tagging, and by (2) utilizing the tagging results to improve search results and end-user search experience.

In accordance with an aspect of the present invention a processor based Semantic Knowledge Management Tool (SKMT) is provided for indexing and searching various data sources such as Internet search, Web pages, file folders, and emails.

The SKMT system as provided herein in accordance with an aspect of the present invention is enabled and configured to scan different content sources and to generate indexes of semantic keywords, and then provide a user-friendly interface that allows users to manage knowledge and data sources, scan and index them, search, explore and visualize result data.

In accordance with an aspect of the present invention a Semantic Knowledge Management Tool is provided as a platform to search, analyze and manage enterprise content. SKMT maps text documents to ontological entities and generates semantic keywords as their metadata for the mapped resources. Documents are indexed with the metadata, which enables both semantic and conventional keywords based search.

FIG. 11 illustrates the Semantic Content Tagging and Search process. As illustrated in FIG. 11, the tool as provided in accordance with an aspect of the present invention scans different data sources such as an article 110, generates semantic keywords for each document through semantic tagging in a semantic keyword tagged document 112, and indexes them into an indexed document 114. This allows to perform a search with the keywords that are also tagged to the article 110, generating a better and more relevant search result.

A search interface provided in accordance with an aspect of the present invention provides semantic suggestions to user queries, and retrieves and visualizes search results based on the indexes.

With semantic indexes, the SKMT system advances the state of the art of enterprise content management and search by:
a) Seamless and easy integration of various data sources via their semantic indexes;
b) Providing search result with higher precision with semantic suggestions;
c) Improving search experience by semantic visualization technology—cluster maps;
d) Revealing semantic linkages among documents for deeper and more relevant search; and
e) Automating tag cloud generation including both semantic and regular keywords.

Ontologies and Knowledge Bases

Performance of the above mentioned semantic tagging and search application is highly dependent on its ontology. A term within content can be semantically tagged and retrieved only if it is properly defined in the ontology. There are several comprehensive and publicly available ontological knowledge bases that can be used in Semantic Tagging systems such as described in "[Fabian M. Suchanek, Gjergji Kasneci, and Gerhard Weikum, "Yago: a core of semantic knowledge," in *WWW '07: Proceedings of the 16th international conference on World Wide Web*, 2007, pp. 697-706"; "The DBpedia Ontology. http://wiki.dbpedia.org/ontology at WWW on Sep. 16, 2013" and "OpenCyc. OpenCyc for the Semantic Web. http://sw.opencyc.org at WWW on Sep. 16, 2013."

WordNet "WordNet—a Lexical Database for English. http://wordnet.princeton.edu/ at WWW on Sep. 16, 2013" is a lexical knowledge base that covers most concepts defined in the English language. It has 146312 defined noun word sense pairs. Besides concepts, it also includes some instances such as people, organizations, geographic locations, books, songs, etc. However, WordNet doesn't contain most named instances of concepts it covers. Such instances are vital to most Semantic tagging and search use cases and should be included in ontologies in an evolutionary manner.

Wikipedia "http://en.wikipedia.org/wiki/Knowledge_base at WWW on Oct. 17, 2012" covers most up-to-date named entities—instances of concepts. But it lacks formally defined hierarchical relationships among instances. Wikipedia is a comprehensive online encyclopedia written collaboratively by volunteers. Each Wikipedia article has its own unique title name, and can be treated as a named instance. Redirection links within an article can be utilized to link to synonymous article titles. In addition, an article also contains infobox "http://en.wikipedia.org/wiki/Help:Infobox at WWW on Oct. 17, 2012", which is a summary table that contains information such as birth date and occupation of people, population and coordinates of cities, etc. Unlike in an ontology, hierarchical relationships among articles are not formally defined. One article can be categorized in various ways. Thanks to user contributions, its content rapidly evolves and remains up to date, which is very desirable when dealing with current documents.

DBpedia system "The DBpedia Ontology. http://wiki.dbpedia.org/ontology at WWW on Sep. 16, 2013" extracts structured multilingual information from Wikipedia infoboxes, categories, links, etc., and represents data in (Resource Description Framework) RDF format. DBpedia is also part of the Linked Data project "Christian Bizer, Tom Heath, Kingsley Idehen, and Tim B. Lee, "Linked data on the web," in *WWW '08: Proceeding of the 17th international conference on World Wide Web*, New York, N.Y., USA, 2008, pp. 1265-1266" and it includes links to other open structured data sources such as W3C WordNet, YAGO, and GeoNames as described in "WordNet—a Lexical Database for English. http://wordnet.princeton.edu/ at WWW on Oct. 17, 2012"; "Fabian M. Suchanek, Gjergji Kasneci, and Gerhard Weikum, "Yago: a core of semantic knowledge," in *WWW '07: Proceedings of the 16th international conference on World Wide Web*, 2007, pp. 697-706" and "GeoNames. http://www.geonames.org/ downloaded at WWW on Oct. 17, 2012".

YAGO uses Wikipedia as a information source. YAGO extracts 14 relationship types, such as subClassOf, familyNameOf, and locatedIn from Wikipedia categories and redirection information. Unlike DBpedia, YAGO does not use the full Wikipedia category hierarchy when extracting subClassOf relationships, instead it maps leaf categories to Word Net concepts with a hybrid method based on heuristics.

OpenCyc is a domain independent knowledge base that contains hundreds of thousands of concepts and millions of statements. In OpenCyc, there are relationships such as aliases, type of instance of subtypes, instances, same as defined between instances.

UNIpedia "Murat Kalender, Jiangbo Dang, and Susan Uskudarli, "UNIpedia: A Unified Ontological Knowledge Platform for Semantic Web Content Tagging and Search," in the 4th IEEE International Conference on Semantic Computing, Pittsburgh, Pa., USA, 2010", developed by Siemens™ Corporate Research, is a high quality, comprehensive, up-to-date, domain independent knowledge resource for semantic applications. UNIpedia uses WordNet as its backbone ontology, and maps instances from other knowledge bases to WordNet concepts by introducing an is A relationship between them. Its mapping algorithms exploit ontological and statistical features based on WordNet concept depth (DP), Information Content (IC), Google Popularity and Normalized Google Popularity (NGO) for deriving the most relevant concept. By combining WordNet, Wikipedia and OpenCyc, the current version of UNIpedia includes 2242446 terms, 74390 concepts and 1491902 instances.

Semantic Tagging

There are three classes of Semantic tagging systems: manual, semi-automatic and automatic as described in "L. Reeve and H. Han, "Semantic Annotation for Semantic Social Networks Using Community Resources," *AIS SIG-SEMIS Bulletin*, pp. 52-56, 2005." In manual tagging systems, users tag documents with a controlled vocabulary defined in an ontology. Manual tagging is a time consuming process, which requires deep domain knowledge and expertise, also introduces inconsistencies by human annotators. Semalink as described in "[S. Wiesener, W. Kowarschick, and R. Bayer," SemaLink: An Approach for Semantic Browsing through Large Distributed Document Spaces, "*Advances in Digital Libraries Conference, IEEE*, p. 86, 1996" is an example of manual semantic tagging system.

Semi-automatic systems analyze documents and offer ontological terms, from which annotators may choose. Semi-automatic may utilize humans to disambiguate terms.

Automated semantic tagging systems analyze documents and automatically tag them with ontological concepts and instances. Zemanta™ as described in "www.zemanta.com at WWW on Oct. 17, 2012" is an automatic semantic tagging system that suggests content from various sources such as Wikipedia, YouTube™, Flickr™ and Facebook™.

Zemanta disambiguates terms and maps them to the Common Tag ontology as described in "(2010) The Common Tag Website. http://www.commontag.org/ at WWW on Oct. 17, 2012."

SemTag as described in "Stephen Dill et al., "SemTag and seeker: bootstrapping the semantic web via automated semantic annotation," in *WWW '03: Proceedings of the 12th international conference on World Wide Web*, Budapest, Hungary, 2003, pp. 178-186" uses Taxonomy-based Disambiguation (TBD) to disambiguate terms and maps documents to entities defined in TAP knowledge base. TAP knowledge base is not a comprehensive knowledge base that consists of only 72,000 concepts.

Semantic TagPrint as described in "Netcraft. April 2009 Web Server Survey. http://news.netcraft.com/archives/2009/04/06/april_2009_web_server_survey.html," developed by Siemens Corporate Research, is another automated content tagging system. It maps a text document to semantic tags defined as entities in an ontology. Semantic TagPrint uses a linear time lexical chaining Word Sense Disambiguation (WSD) algorithm for real time concept mapping. In addition, it utilizes statistical metrics and ontological features of the ontology for weighting and recommending the semantic tags.

Search Technologies

The performance of a search engine is measured based on two factors: precision and recall. Precision is defined as the ratio between numbers of relevant documents over number of documents retrieved by the search engine. Recall value is defined as the ratio between numbers of relevant documents retrieved by the search engine over all relevant resources that exist.

Modifying queries to increase one of the factors generally cause other factor to decrease. There are two main approaches for improving search quality as described in "Dan I. Moldovan and Rada Mihalcea, "Improving the search on the Internet by using WordNet and lexical operators," *IEEE Internet Computing*, pp. 34-43, 1998."

A first approach utilizes multiple search engines and combines search results by filtering the duplicate search results. These kinds of tools are named meta-search engines e.g. AskJeeves http://www.ask.com/"; MetaCrawler "MetaCrawler™. http://www.metacrawler.com/" and Clusty™ "http://clusty.com/". For example, Clusty groups similar phrases that are related to the user's query. It gives users an idea about resulted concepts, and filters irrelevant resources.

A second approach is to analyze Web content using Natural Language Processing (NLP) techniques. This approach has two phases.

A first phase is the query extension process. Queries are extended with synonyms of the searched term. Then, the meaning of the searched term is requested from the user or it is extracted using WSD techniques. The first phase also supports natural language queries such as "What is the capital city of Turkey". These kinds of queries are converted into machine readable queries using NLP algorithms.

A second phase includes improving the quality of the returned results using text analysis. WSD algorithms can be applied to the result set and documents can be filtered that have different context than the requested one. Semantic search engines such as Hakia™ and Powerset™ are examples of NLP based search engines.

Semantic Knowledge Management Tool (SKMT)

The SKMT provided herein in accordance with various aspects of the present invention relies on two of previous inventions assigned to the assignee of the present invention: UNIpedia and Semantic TagPrint. UNIpedia offers a formal, declarative knowledge base of most named English entities. Then Semantic TagPrint utilizes UNIpedia to tag and contextualize contents. The SKMT system scans data sources, generates indexes with Semantic Tag Engine, and then enhances content search with semantics and contexts. Finally, SKMT visualizes search results by explicitly presenting their semantics and inherent relationships in a cluster map, by which end users can further explore the whole content space to find interesting and yet overlooked documents.

Ontologies provide a foundation, upon which machine understandable knowledge can be obtained and tagged, and as a result, it makes semantic tagging and search possible. WordNet or Wikipedia have been used for this purpose. However, WordNet only covers most named English concepts while Wikipedia covers mainly instances of concepts. None of them can serve as an tagging ontology alone. To solve this issue, the UNIpedia platform was developed—a platform for unifying different ontological knowledge bases by reconciling their instances as WordNet concepts. UNIpedia is used to as the ontological knowledge base of the Semantic Knowledge Management Tool (SKMT) provided herein in accordance with various aspects of the present invention.

Ontology mapping and weighting within a context are challenges in any semantic tagging and search systems. To address these challenges, a semantic tagging system was developed—Semantic TagPrint—to map a text document to semantic tags defined as entities in UNIpedia.

Semantic TagPrint is an automated semantic tagging engine that annotates free text using UNIpedia ontological entities. Three modules were designed for this component.

1. Noun Phrase Extraction: This module is also known as named entity detection. It extracts named entities, noun phrases in general, from the input text. OnenNLP was adopted to detect and tokenize sentences, and assign Part-of-Speech (PoS) tags to tokens. Entity names were then extracted based on PoS tags.

2. Ontology Mapping: This module maps extracted entity names to OMIT concepts and instances with two steps: Phrase mapping and Sense mapping. Phrase mapping matches the noun phrase of an entity name to a predefined concept or instance. Sense mapping utilizes a linear-time lexical chain algorithm to find the sense of the matched concept if it has several senses defined in ontologies. The lexical chaining algorithm disambiguates terms based on several ontological features such as Hypernymy and Holonymy.

3. Ontology Weighting: This module utilizes statistical and ontological features of concepts to weigh semantic tags. Therefore, the input text will be annotated using the semantic with higher weights.

Semantic TagPrint uses a linear time lexical chaining Word Sense Disambiguation (WSD) algorithm for real time concept mapping. In addition, it utilizes statistical metrics and ontological features of the ontology for weighting and recommending the semantic tags. Semantic tags transfer a document into a graph where nodes are named entities from content and links are semantic relations among the entities. This graph of semantic tags captures meanings and context of these entities.

FIG. 12 illustrates an example mapping of a semantic tagging of a piece of textual content to semantic tags defined in an ontology and knowledge base as described in "L. Reeve and H. Han, "Semantic Annotation for Semantic Social Networks Using Community Resources," *AIS SIGSEMIS Bulletin*, pp. 52-56, 2005." The ontological concept classes are represented as ovals (e.g. City and Painter), while the concept instances are shown as rectangles (e.g. Philadelphia and Thomas Eakins).

With automatically generated semantic tags, content from heterogeneous source can be easily integrated at semantic level. Moreover, these tags will facilitate semantic content management and search applications with more accurate and meaningful representations, more relevant search results, and intuitive human-machine interaction and navigations.

Conceptual Architecture

In accordance with various aspects of the present invention a Semantic Knowledge Management Tool (SKMT) platform is provided to search, analyze and manage content. Semantic Knowledge Management Tool (SKMT) is a platform to search, analyze and manage enterprise content. It supports indexing and searching of both local and web resources. Search results get related with common terms and are visually shown in clustered graphs.

SKMT uses Semantic TagPrint to generate metadata for given documents. Documents are indexed with their metadata, which enables both semantic and conventional keyword based search. SKMT supports indexing and searching on various data sources including documents, emails, web sites, and Web search results.

SKMT utilizes semantic visualization technology to show indexed contents in a connected graph-cluster map. In a graph, documents are represented as nodes and nodes are connected to each other with search input terms. Documents, which contain the same search terms, are clustered together. This feature improves usability of such a search tool, and makes it explicit the semantic relations between documents.

Another feature supported in SKMT is an automatic generated tag cloud. Significant terms of a document are determined and indexed in an SKMT RDF repository. SKMT can select these significant terms and show them as a tag cloud for a document or a collection of documents.

FIG. 13 illustrates a system architecture of the SKMT platform. In the following sections, the SKMT's modules will be analyzed and described comprehensively including through SKMT features.

Semantic Search

Semantic search works based on the meanings of search and document terms. In order to understand search queries and retrieve most relevant results, semantic search tools should understand search terms and their context. SKMT can take search terms and their meanings directly from end users using an auto complete search field illustrated in FIG. 14.

When a user starts typing search terms into the search input box, the semantic suggestion module of SKMT suggests phrases that start with a given input from the vocabulary of a selected ontology.

Suggestions are ontological entities, which compose of entities' names with their parents' names. Then a system user selects one of the term's meanings to start semantic search process. FIG. 14 illustrates a list defined meanings of the term Siemens in UNIpedia. The list in FIG. 14 in one embodiment of the present invention is an auto-complete list. It is noted that Siemens is the assignee on the present patent application.

Meanings of terms (key words) within a document are extracted using Semantic Tag Print in SKMT. Semantic TagPrint applies WSD algorithms to extract meanings of terms. Semantic search improves keyword search by removing keywords dependency by handling synonymous (having same meaning) and polysemous (having different meanings) terms and supporting the search utilizing semantic relations between terms. Synonyms of a search term would be mapped to the same ontological entities in UNIpedia by Semantic TagPrint, thus documents containing synonyms of a search term would be returned in the semantic search result.

FIGS. 15A-15D illustrate a user interface on a computer display for a search results of a semantic search and keyword based search of Barack Obama in the CNN test data set.

Figure 15A:
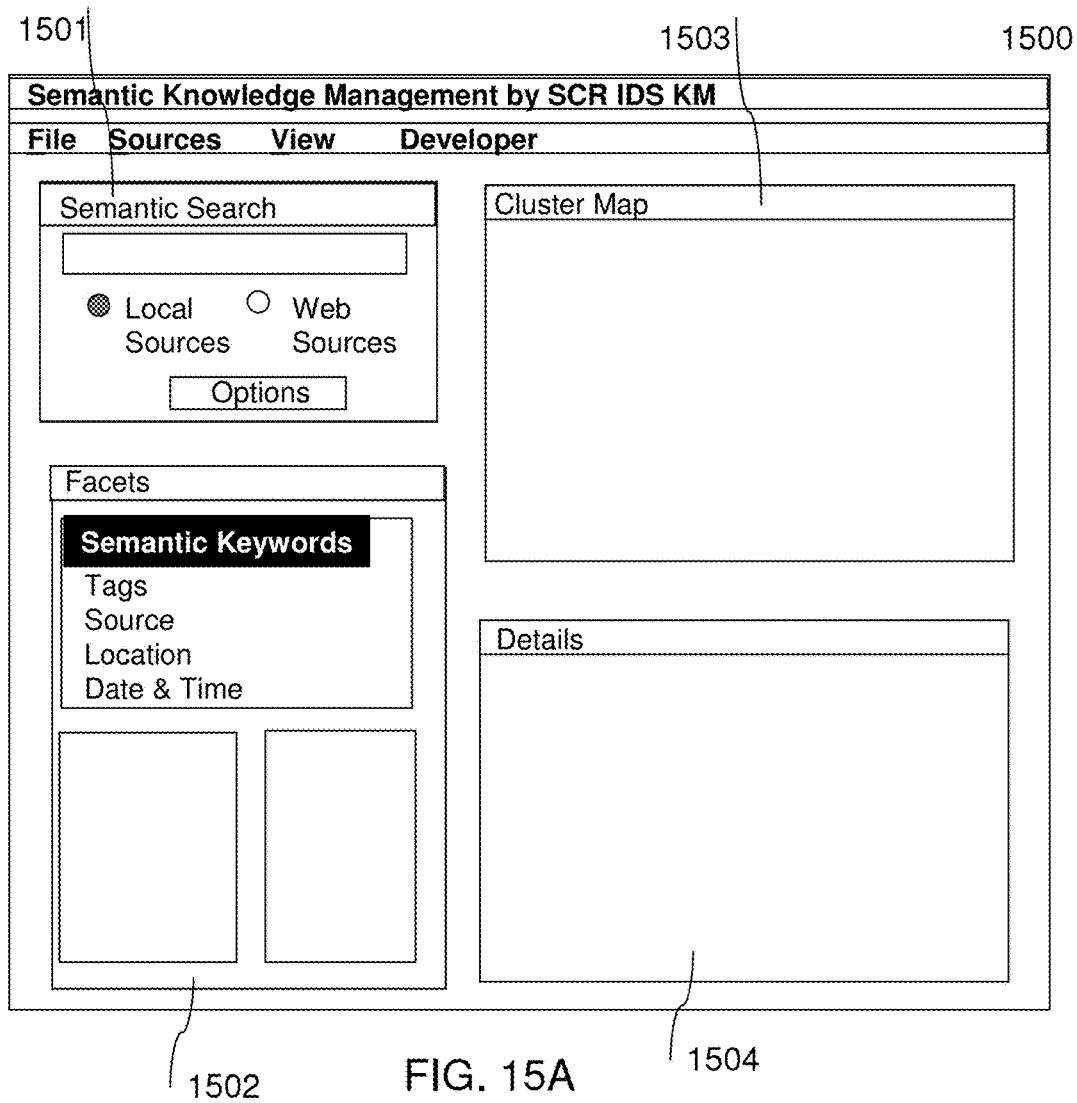
Figure 15B:
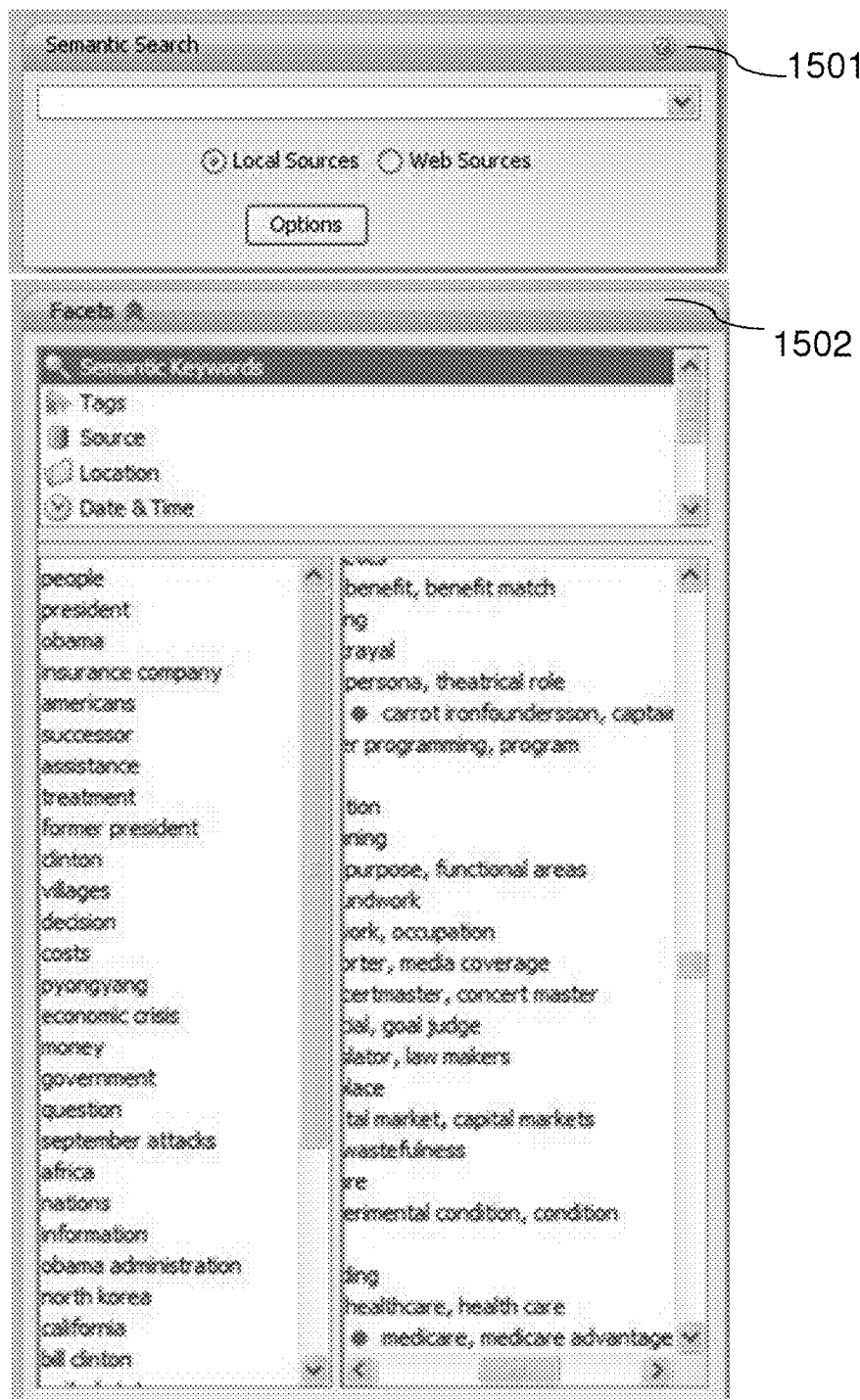
Figure 15C:
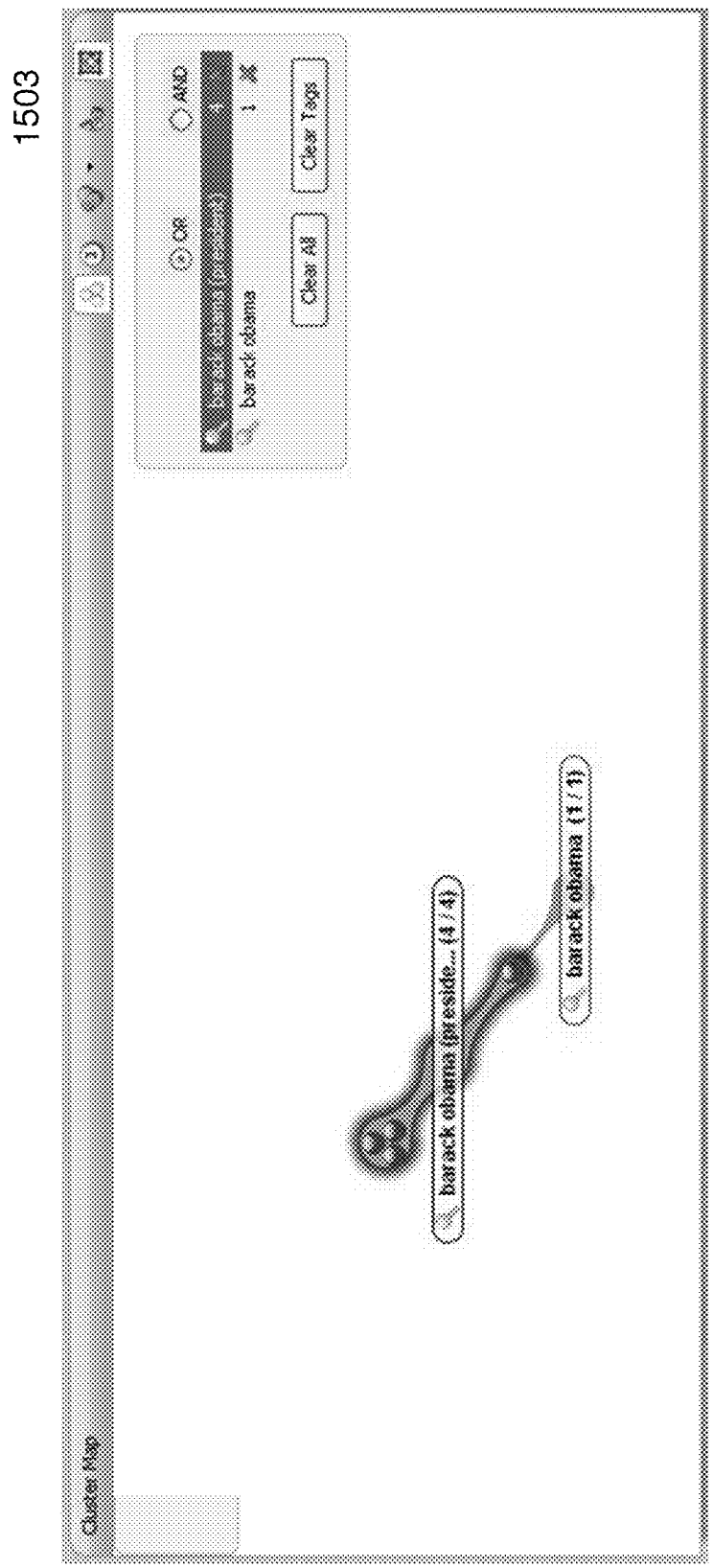

FIG. 15A provides a diagram of the user interface, containing a screen 1500 with 4 identified blocks: block 1501 which is the Semantic Search block; block 1502 which enables selection of different facets, such as Semantic Keywords and Tags; block 1503 which provides a cluster map; and block 1504 which provides the details. The blocks in one embodiment of the present invention are part of a single screen that is displayed. FIGS. 15B-15D illustrate further details of the blocks 1501-1504, based on a search for Barack Obama.

The semantic search recall is better than the keyword based search. As shown in FIG. 15D, there are four documents returned from the semantic search and one from the keyword based search. There are three document clusters in the graph in FIG. 15C. The left cluster contains three documents and these documents contain in their content only synonyms of Barack Obama such as President Obama and Obama. The middle cluster contains one document and this document contains the term Barack Obama and it is mapped to the meaning president. Therefore, it is a common document for both search queries.

Users would be interested in only a specific meaning of a term when they are searching for it. Documents that contain terms that have other meanings than this intended meaning would be filtered in a semantic search. To demonstrate this feature of the semantic search, apple and Apple Inc. pages of English Wikipedia are indexed using SKMT. Then apple (edible fruit), apple (company), and apple are searched in the indexed documents. FIG. 16 illustrates the search results.

The semantic search precision score is higher than the keyword based search's score for these search results. There are two result documents in the graph shown in FIG. 16. One document contains Apple (edible fruit) and the other one contains apple (company) in the semantic search results. All documents contain the term apple in the keyword based search result. When a user is interested in only one particular meaning of a search term, semantic search can filter out irrelevant documents, which would appear as a result using a keyword based search.

Semantic search also provides searching capability using parent and child relations between semantic tags. For example, a user can search news articles related to capital cities of countries. Documents, which contain instances of capital cities, would be returned in the semantic search results, even if the searched term doesn't appear in their content. FIG. 17 shows the search results for the semantic and keyword based search of capital in the CNN news data.

The semantic search returned fifteen documents. In contrast, keyword search returned six documents, clearly, the recall score of the semantic search is significantly better than the keyword search for the search results. Moreover, the documents returned by the keyword search contain the term capital, which is used in its meaning finance. Therefore, the precision score of the semantic search is also higher than the keyword search.

SKMT Implementation

SKMT is developed by developing semantic ranking and recommendation methods using the output from the Semantic TagPrint systems integration of Aduna Autofocus as described in "Aduna Autofocus—Desktop search application. http://www.aduna-software.com/." New features are also added to the system such as auto-complete, tag cloud, semantic tree, internet and semantic search. Furthermore a performance problem that occurs when working on sources with a high number of documents is improved.

An overview of the SKMT System Architecture is provided in FIG. 18.

User Experience

SKMT User Interface composes of following four main parts: Search, Facets, Cluster Map and Details Panels. The lay-out of this user interface is illustrated in FIG. 15A. FIG. 19A illustrates a Search Panel, FIG. 19B illustrates a Facets Panel, FIG. 19C illustrates a Cluster Map and FIG. 19D illustrates a Details Panel as part of a graphical user interface (GUI) in a system for a SKMT tool based on a search for Michael Schumacher.

Search Panel

Search Panel lets users to build and execute search queries. SKMT supports keyword search, semantic search and combination. When a user starts typing into the auto complete field, the suggestion module of SKMT suggests phrases that start with given input from the vocabulary of a selected ontology. Suggestions are ontological entities, which compose of entities' names with their parent's names. Users can select one of the suggestions or enter their own keywords. If a user uses own keywords, then a keyword based search is executed. Otherwise semantic search is done. Users are also able to generate queries that include both semantic phrases and keywords. For instance, a user can search documents about Siemens Company and health constructing the query illustrated in FIG. 20.

SKMT supports searching on both local and web resources. Google Search engine is used to enable web search. Firstly, a constructed query is converted into a search phrase. Semantic keywords are converted into a phrase with their parent concept names. For example, corresponding search phrase for the query in FIG. 20 is "Siemens company+ health". Then the search phrase is queried in Google using their API. Addresses of returned N web documents are sent to the Crawling Manager module of SKMT and they are indexed and semantically tagged.

Documents are indexed with unique ids of semantic tags, which are concept and instances in an ontology to enable semantic search.

When a user selects a search phrase from the autocomplete field, its unique id is searched over the indexed documents. In this way, the synonym problem of keyword based search is handled. Furthermore, documents are also indexed with semantic tags' ancestor concepts to enable hierarchical search. For instance, when a user searched the concept "president", documents which are indexed with child concepts and instances of "president" are also retrieved in search results.

Indexed documents are stored as an OpenRDF repository as described in "OpenRDF-RDF repository. http://www.openrdf.org" and Lucene index files. The repositories can be exported in various formats such as N3 as described in "Tim Berners-Lee. Notation3 N3: A readable RDF syntax. http://www.w3.org/DesignIssues/Notation3". FIG. 21 shows part of a repository file exported in N3 format. Triple with the subject "http://scr.siemens.com/semtag" has value of assigned semantic tags by Semantic TagPrint.

Facets Panel

SKMT extracts semantic tags from a given document or a collection of document using Semantic TagPrint. These semantic tags are ontological entities defined in an ontology like UNIpedia or a domain-specific ontology. They can be represented in a tree to explicit the semantic relationships among them, which could help users to broaden or narrow their search scopes by format or in a list based on their occurrence frequencies. Showing in a tree gives extra information about terms (ancestor concepts and synonyms). However, locating a specific concept is harder than locating the same concept in a list, because a user has to know the exact position of the concept in the ontology's taxonomy.

SKMT uses the taxonomy of WordNet ontology. This taxonomy is complicated for an ordinary user. Therefore, a user friendly approach is required in SKMT to list semantic tags. FIG. 22 shows significant terms and semantic tags for the CNN news data.

Facets Panel is used to cluster indexed documents under various metadata types and shows assigned tags for the clustered documents. Documents can be clustered based on their extraction source, creation time, type, language and size. FIG. 22 illustrates an instance of the Facets Panel for the extraction source metadata type.

Semantic Keywords part of Facets Panel shows significant terms and semantic tags for selected documents. FIG. 22 shows significant terms and semantic tags for the indexed documents, which are tagged with the instance "Michael Schumacher".

The left side of Semantic Keywords shows the significant terms in a list. Frequently used top N noun phrases are indexed and shown as significant terms. This feature of Aduna AutoFocus is also modified. Previously, the list was generated with frequently passed words instead of noun phrases.

The right side of Semantic Keywords shows semantic tags for selected documents. The tree representation of semantic tags is constructed based on the taxonomy of WordNet ontology. It is one of the new features added to Aduna Autofocus.

Cluster Map Panel

SKMT shows search results visually in a connected graph-cluster map. Documents are represented as a node in the graph and nodes are connected each other with search terms. Documents, which contain same search keywords, are clustered together. This feature enhances content findability and gives valuable information about documents' relations between each other.

When a user selects one of a cluster, search keyword or a document, it affects content of both Semantic Keywords Panel and Details Panel. These panels' contents are populated based on the selected items. FIG. 23 illustrates a Cluster Map Panel of SKMT framework.

Documents in Cluster Map are represented as nodes in different colors; selected ones are red and other ones are in yellow color. Search queries, and sources are represented with their names as a cluster consisting collection of documents. These types of graph elements also include two numbers next to their names; number of documents in the cluster which includes the selected search queries and total number of documents in the cluster, respectively.

Right side of the Cluster Map Panel is the list of search queries and document sources. For example in FIG. 23, the first three items in the list are examples of web search sources and the last item is a local source. Users can select multiple items in the list and see documents falls into the selection.

The graph in FIG. 23 includes three web search queries, one local source and six document clusters. The cluster in the centre of graph includes a collection of documents, which contains both the semantic tags "Michael Schumacher" and "Mika Hakkinen". This is the one of the benefits of showing search results visually in a graph. In this way, users can see the documents contain common search terms.

Semantic Tag Cloud

Tag cloud is another feature supported in SKMT. Significant terms of a document can be determined and indexed. These significant terms are shown as a tag cloud for a document or a collection of documents.

SKMT supports two kind of tag clouds: keyword and semantic. Keyword based tag cloud shows frequently used top N significant terms of selected clusters as a tag cloud. In contrast, Semantic tag cloud shows frequently used top N semantic tags of selected clusters as a tag cloud. A semantic tag cloud shows valuable information about the content of the documents and the relations between them. Users can easily get brief information about the documents without reading them. FIG. 24 is an example of an automatically generated keyword based tag cloud and FIG. 25 is an example of semantic tag cloud.

In the tag cloud, related concepts are positioned closer to each other. This feature gives information about concepts and relations between them. For example in FIG. 26, which illustrates an automatically generated semantic tag cloud, "driver", "formula" and "principality of Monaco" are common concepts between the searched terms "Michael Schumacher", "Mika Hakkinen" and "Rubens Barrichello". "Ferrari" and "Ross brawn", which are in closer positions in the graph to "Michael Schumacher", are mostly related concepts with him. Similarly, "Mika Hakkinen" was born in "Republic of Finland" and they are positioned closer to each other.

Semantic tag cloud is provided as a web service in accordance with an aspect of the present invention. FIG. 27 illustrates a comparison of author provided tags with semantic tag cloud generated by the web service provided in accordance with an aspect of the present invention for a given CNN article.

Details Panel

Details Panel shows details of the documents, which are selected in the Cluster Map Panel. Appearance of the panel is similar to Google search results. Each document is represented in three rows. The first row composes of a link named as title of the document that opens the document itself, document address, size, type, creation time, respectively. The second row includes initial text of the document if it is a local resource or returned Google search content if it is a web content. The third row shows significant terms extracted from the Semantic TagPrint. FIG. 28 illustrates details of two documents which are items of a selected cluster.

The methods as provided herein are, in one embodiment of the present invention, implemented on a system or a computer device. Thus, steps described herein are implemented on a processor in a system, as shown in FIG. 29. A system illustrated in FIG. 29 and as provided herein is enabled for receiving, processing and generating data. The system is provided with data that can be stored on a memory 2901. Data may be obtained from an input device. Data may be provided on an input 2906. Such data may be data provided by users via a user interface, from a database or any other source, for instance over a network such as the Internet. The processor is also provided or programmed with an instruction set or program executing the methods of the present invention that is stored on a memory 2902 and is provided to the processor 2903, which executes the instructions of 2902 to process the data from 2901. Data provided by the processor can be outputted on an output device 2904, which may be a display to display images or data or a data storage device. The processor also has a communication channel 2907 to receive external data from a communication device and to transmit data to an external device, for instance to a server connected to the processor via the Internet. The system in one embodiment of the present invention has an input device 2905, which may include a keyboard, a mouse, a pointing device, or any other device that can generate data to be provided to processor 2903.

The processor can be dedicated or application specific hardware or circuitry. However, the processor can also be a general CPU or any other computing device that can execute the instructions of 2902. Accordingly, the system as illustrated in FIG. 29 provides a system for processing data and is enabled to execute the steps of the methods as provided herein in accordance with one or more aspects of the present invention.

Accordingly, methods and systems for Semantic Knowledge Management Tool (SKMT) as a platform have been provided herein to search, analyze and manage enterprise content. SKMT maps text documents to ontological entities and generates metadata for the mapped resources. Documents are indexed with their metadata, which enables both semantic and conventional keywords based search. SKMT supports indexing and searching of both local and web resources. SKMT enhances content findability and gives valuable information about documents' relations between each other.

In accordance with an aspect of the present invention a first semantic search phrase is just a start point to form a search space. Different phrases can be tried multiple times in searches. This allows the search space to be modified, expanded, reduced or drifted. A search can generate different clusters and/or tag clouds based on retrieved documents. A user can select clusters or clouds that meets search requirements and apply logical operators AND/OR on them to form a search space as if the user runs a SQL-like query on meta data (semantic tags in this case). This may modify the original search phrase based on the keywords or semantic tags and/or a combination thereof of one or more selected search results to improve the precision of the search results. Within the current search space, keywords, semantic keywords, clusters, SQL-like queries can be used iteratively to further explore the space and narrow down the results.

An unstructured documents that may be retrieved from the Internet or that was contained in a local file is tagged and indexed in accordance with one or more aspects of the present invention. While the document originally may have been an unstructured or free text document, which in one embodiment only contained a search phrase as free text now has become a structured document that is either indexed or tagged or both. This allows the originally unstructured document to be searched by an SQL or SQL-like query, wherein available indices or tags can be searched based on the query.

It is noted that indexing and tagging of documents and thus aspects of the present invention can be modified or updated based on changed or updated meaning of words or vocabulary.

In accordance with an aspect of the present invention, Social Network analysis features are added to find relation between people and recommend users to experts in a searched topic. In accordance with an aspect of the present invention, document analysis features such as document summarization and document clustering are added to SKMT.

The following references provide background information generally related to the present invention and are hereby incorporated by reference: [1] Wikipedia. Knowledge Management. [Online]. http://en.wikipedia.org/wiki/Knowledge_management; on WWW on Oct. 16, 2012; [2] Hak Lae Kim, Alexandre Passant, John G. Breslin, Simon Scerri, and Stefan Decker, "Review and Alignment of Tag Ontologies for Semantically-Linked Data in Collaborative Tagging Spaces," in /CSC '08: Proceedings of the 2008 IEEE International Conference on Semantic Computing, Washington, D.C., USA, 2008, pp. 315-322; [3] Fabian M. Suchanek, Gjergji Kasneci, and Gerhard Weikum, "Yago: a core of semantic knowledge," in WWW '07: Proceedings of the 16th international conference on World Wide Web, 2007, pp. 697-706; [4] The DBpedia Ontology. [Online]. http://wiki.dbpedia.org/ontology at WWW on Oct. 16, 2012; [5] OpenCyc. OpenCyc for the Semantic Web. [Online]. http://sw.opencyc.org at WWW on Oct. 16, 2012; [6] WordNet. WordNet—a Lexical Database for English. [Online]. http://wordnet.princeton.edu/ at WWW on Oct. 16, 2012; [7] Wikipedia. [Online]. http://en.wikipedia.org/wiki/Knowledge_base at WWW on Oct. 16, 2012; [8] Wikipedia. [Online]. http://en.wikipedia.org/wiki/Help:Infobox at WWW on Oct. 16, 2012; [9] Christian Bizer, Tom Heath, Kingsley Idehen, and Tim B. Lee, "Linked data on the web," in WWW '08: Proceeding of the 17th international conference on World Wide Web, New York, N.Y., USA, 2008, pp. 1265-1266; [10] GeoNames. [Online]. http://www.geonames.org/ at WWW on Oct. 16, 2012; [11] Murat Kalender, Jiangbo Dang, and Susan Uskudarli, "UNIpedia: A Unified Ontological Knowledge Platform for Semantic Web Content Tagging and Search," in the 4th IEEE International Conference on Semantic Computing, Pittsburgh, Pa., USA, 2010; [12] L. Reeve and H. Han, "Semantic Annotation for Semantic Social Networks Using Community Resources," AIS SIGSEMIS Bulletin, pp. 52-56, 2005; [13] S. Wiesener, W. Kowarschick, and R. Bayer, "SemaLink: An Approach for Semantic Browsing through Large Distributed Document Spaces," Advances in Digital Libraries Conference, IEEE, p. 86, 1996; [14] Zemanta. [Online] www.zemanta.com at WWW on Oct. 16, 2012; [15] (2010) The Common Tag Website. [Online]. http://www.commontag.org/ at WWW on Oct. 16, 2012; [16] Stephen Dill et al., "SemTag and seeker: bootstrapping the semantic web via automated semantic annotation," in WWW'03: Proceedings of the 12th international conference on World Wide Web, Budapest, Hungary, 2003, pp. 178-186; [17] Netcraft. April 2009 Web Server Survey. [Online]. http://news.netcraft.com/archives/2009/04/06/april_2009_web_server_survey.html at WWW on Oct. 16, 2012; [18] Dan I. Moldovan and Rada Mihalcea, "Improving the search on the Internet by using WordNet and lexical operators," IEEE Internet Computing, pp. 34-43, 1998; [19] AskJeeves. [Online]. http://www.ask.com/ at WWW on Oct. 16, 2012; [20] MetaCrawler. [Online]. http://www.metacrawler.com/ at WWW on Oct. 16, 2012; [21] Clusty. [Online]. http://clusty.com/ at WWW on Oct. 16, 2012; [22] Aduna Autofocus—Desktop search application. [Online]. http://www.aduna-software.com/ at WWW on Oct. 16, 2012; [23] OpenRDF-RDF repository. [Online]. http://www.openrdf.org at WWW on Oct. 16, 2012; [24] Tim Berners-Lee. Notation3 N3: A readable RDF syntax. [Online]. http://www.w3.org/DesignIssues/Notation3 at WWW on Oct. 16, 2012; [25] Infoseek. [Online]. http://www.infoseek.com/ at WWW on Oct. 16, 2012; [26] AltaVista. Altavista. [Online]. http://www.altavista.com at WWW on Oct. 16, 2012; [27] (2009) Wikipedia. [Online]. http://en.wikipedia.org/wiki/Meta_element at WWW on Oct. 16, 2012; [28] Google. Google search engine. [Online] http://www.google.com/ at WWW on Oct. 16, 2012; [29] Flickr. Flickr. [Online] http://www.flickr.com at WWW on Oct. 16, 2012; [30] Delicious. [Online]. http://www.delicious.com/ at WWW on Oct. 16, 2012; [31] YouTube. [Online]. http://www.youtube.com/ at WWW on Oct. 16, 2012; [32] Yahoo. Yahoo. [Online]. http://developer.yahoo.com/search/content/V1/termExtraction.html/ at WWW on Oct. 16, 2012; [33] John C. Mallery, "Thinking About Foreign Policy: Finding an Appropriate Role for Artificially Intelligent Computers," in Master's thesis, M.I.T Political Science Department., 1988; [34] Thomas Gruber, "Ontology (Computer Science)—definition in Encyclopedia of Database Systems," in Encyclopedia of Database System: Springer-Verlag, 2008; [35] WSMO. (2005) Web Service Modeling Ontology (WSMO) [Online]. http://www.wsmo.org/TR/d2/v1.2/#ontologies/ at WWW on Oct. 16, 2012; [36] I. Niles and A. Pease, "Towards a standard upper ontology," in the 2nd International Conference on Formal Ontology in Information Systems, 2001; [37] Grigoris Antoniou and Frank Van Harmelen, A Semantic Web Primer., 2004; [38] Thuy Dung Nguyen and Min-Yen Kan, "Keyphrase Extraction in Scientific Publications," in] Lecture Notes in Computer Science.: Springer, 2007, pp. 317-326; [39] Xiaoguang Qi and Brian D. Davison, "Web page classification: Features and algorithms," ACM Comput. Surv., pp. 1-31, 2009; [40] Christopher C. Shilakes and Julie Tylman. (1998, November) Enterprise Information Portals; [41] W. N. Francis and H. Kucera, "Brown Corpus Manual," Providence, R.I., US, 1979; [42] George A. Miller, Claudia Leacock, Randee Tengi, and Ross T. Bunker, "A semantic concordance," in HL T '93: Proceedings of the workshop on Human Language Technology, Princeton, N.J., 1993, pp. 303-308; [43] Sketch. Sketch Engine. [Online]. http://sketchengine.co.uk at WWW on Oct. 16, 2012; [44] JustTheWord. JustTheWord. [Online]. http://193.133.140.102/JustTheWord/ at WWW on Oct. 16, 2012; [45] Satanjeev Banerjee and Ted Pedersen, "An Adapted Lesk Algorithm for Word Sense Disambiguation Using WordNet," Computational Linguistics and Intelligent Text Processing, pp. 117-171, 2002; [46] Diana McCarthy, Rob Koeling, and Julie Weeds, "Ranking WordNet Senses Automatically," 2004; [47] Michel Galley and Kathleen McKeown, "Improving Word Sense Disambiguation in Lexical Chaining," 2003; [48] WWW. W3C Semantic Web Activity. [Online]. http://www.w3.org/2001/sw/ at WWW on Oct. 16, 2012; [49] Alex Iskold. The Road to the Semantic Web. [Online]. http://www.readwriteweb.com/archives/semantic_web_road.php/ at WWW on Oct. 16, 2012; [50] Alex Iskold. Top-Down: A New Approach to the Semantic Web. [Online]. http://www.readwriteweb.com/archives/the top-down_semantic_web.php/ at WWW on Oct. 16, 2012; [51] George A. and Beckwith, Richard Miller, Christiane Fellbaum, Derek Gross, and Katherine J. Miller, "Introduction to WordNet: an On-line Lexical Database," International Journal of Lexicography, pp. 235-244, 1990; [52] Adam Pease, Raymond A. Liuzzi, and David Gunning, "Knowledge Bases," in Encyclopedia of Software Engineering, 2001; [53] Soren Auer et al., "DBpedia: A Nucleus for a Web of Open Data," The Semantic Web, pp. 722-735, 2008; [54] (2009) Wikipedia. [Online] http://en.wikipedia.org/wiki/Tag_%28metadata%29 at WWW on Oct. 16, 2012; [55] Delicious. [Online]. http://www.delicious.com/ at WWW on Oct. 16, 2012; [56] Youtube. [Online] http://www.youtube.com/ at WWW on Oct. 16, 2012; [57] Wikipedia-Metadata. [Online]. http://en.wikipedia.org/wiki/Metadata at WWW on Oct. 16, 2012; [58] Faviki. Faviki. [Online]. http://www.faviki.com/ at WWW on Oct. 16, 2012; [59] Olena Medelyan, Eibe Frank, and Ian H. Witten, "Human-competitive tagging using automatic keyphrase extraction," in Proc Conf on Empirical Methods in Natural Language Processing, 2009; [60] Zhichen Xu, Yun Fu, Jianchang Mao, and Difu Su, "Towards the Semantic Web: Collaborative Tag Suggestions," in WWW2006: Proceedings of the Collaborative WebTagging Workshop, 2006; [61 Xinghua Li, Xindong Wu, Xuegang Hu, Fei Xie, and Zhaozhong Jiang, "Keyword Extraction Based on Lexical Chains and Word Co-occurrence for Chinese News Web Pages," in ICDM Workshops, 2008; [62] Fei Wu and Daniel S. Weld, "Autonomously semantifying wikipedia," in CIKM '07: Proceedings of the sixteenth ACM conference on Conference on information and knowledge management, 2007, pp. 41-50; [63] Fei Wu and Daniel S. Weld, "Automatically refining the wikipedia infobox ontology," in WWW '08: Proceeding of the 17th international conference on World Wide Web, 2008, pp. 635-644; [64] W3C WordNet. [Online]. http://www.w3.org/TR/wordnet-rdf/ at WWW on Oct. 16, 2012; [65] R. L. Cilibrasi and P. M. B. Vitanyi, "The Google Similarity Distance," IEEE Transactions on Knowledge and Data Engineering, pp. 370-383, 2007; [66] Maria Ruiz-Casado, Enrique Alfonseca, and Pablo Castells, "Automatic Assignment of Wikipedia Encyclopedic Entries to WordNet Synsets," Advances in Web Intelligence, pp. 380-386, 2005; [67] Tobias Hawker and Matthew Honnibal, "Improved Default Sense Selection for Word Sense Disambiguation," in Proceedings of the Australasian Technology Workshop, Sydney, 2006; [68] Risto Gligorov, Warner T Kate, Zharko Aleksovski, and Frank van Harmelen, "Using Google distance weight approximate ontology matches, in WWW '07: Proceedings of the 16th international conference on World Wide Web, New York, N.Y., USA, 2007, pp. 767-776; [69] Nuno Seco, Tony Veale, and Jer Hayes, An Intrinsic Information Content Metric for Semantic Similarity in WordNet; [70] David Martinez and Eneko Agirre, "One sense per collocation and genre/topic variations," in the 2000 Joint SIGDAT conference on Emperical methods in natural processing and very large corpora, 2000, pp. 207-215; [71] THEwikiStics. Wikimedia statistics. [Online]. http://wikistics.falsikon.de/2009/ at WWW on Oct. 16, 2012; [72] PostGreSQL PostGreSQL home page. [Online]. http://www.postgresql.org/ at WWW on Oct. 16, 2012; [73] WordnetSQL WordNet SQL Builder. [Online]. http://wnsql-builder.sourceforge.net/ at WWW on Oct. 16, 2012; [74] MySQL MySQL home page. [Online]. http://www.mysql.com/ at WWW on Oct. 16, 2012; [75] WikiSQL Wikipedia SQL dumps. [Online]. http://download.wikimedia.org/enwiki/ at WWW on Oct. 16, 2012; [76] WikiSQL Wikipedia Web Service. [Online]. http://download.wikimedia.org/enwiki/ at WWW on Oct. 16, 2012; [77] Jena. Jena Semantic Web Framework home page. [Online]. http://jena.sourceforge.net/ at WWW on Oct. 16, 2012; [78] JWordNet. JWordNet API home page. [Online]. http://jwordnet.sourceforge.net/ at WWW on Oct. 16, 2012; [79] Lucene. Apache Lucene. [Online]. http://lucene.apache.org/java/docs/index.html/ at WWW on Oct. 16, 2012; [80] Wikipedia Download. Wikimedia Downloads. [Online]. http://download.wikimedia.org/ at WWW on Oct. 16, 2012; [81] Shuang Liu, Clement Yu, and Weiyi Meng, "Word sense disambiguation in queries," in CIKM '05 Proceedings of the 14th ACM international conference on Information and knowledge management, 2005; [82] Murat Kalender, Jiangbo Dang, and Susan Uskudarli, "Semantic TagPrint: Indexing Content at Semantic Level," in the 4th IEEE international conference on Semantic Computing, Pittsburgh, Pa., USA, 2010; and [83] (2010) Help:Infobox—Wikipedia, The Free Encyclopedia. [Online]. http://en.wikipedia.org/wiki/Help:Infobox at WWW on Oct. 16, 2012.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the claims.

The invention claimed is:

1. A method for performing a semantic search to retrieve documents from a document repository, comprising:
a processor accepting through a graphical interface a search phrase provided by a user;
the processor analyzing the search phrase and suggesting a plurality of semantic search phrases generated from a stored vocabulary of an ontology to suggest a context;
the processor accepting a first semantic search phrase selected from the plurality of semantic search phrases;
the processor indexing and semantically tagging a plurality of documents in a storage medium, wherein at least one document was unstructured prior to the indexing and semantically tagging, wherein indexing and semantically tagging the plurality of documents comprises the processor weighing a plurality of semantic concepts generated from a plurality of extracted noun phrases, wherein the plurality of semantic concepts is weighed by term significance (TS) scores, wherein the TS scores are calculated with both semantic and statistical information, and wherein the semantic information includes lexical chaining Word Sense Disambiguation (WSD) scores and Depth and Information Content (IC) values, and the statistical information includes Term Frequency (TF) and Inverse Google Popularity (IGP);
the processor extracting a plurality of semantic tags from the indexed and semantically tagged documents; and
the processor defining a plurality of groups based on the indexed and semantically tagged documents, wherein the documents in the plurality of documents are indexed with unique identifications of semantic tags, and wherein the processor searches the indexed documents based on a unique identification of the first semantic search phrase.

2. The method of claim 1, wherein the at least one unstructured document is stored in a local file and is semantically indexed before the search phrase is accepted by the processor.

3. The method of claim 1, wherein the processor retrieves the at least one unstructured document via an Internet and semantically tags and indexes the retrieved document after the search phrase is accepted by the processor.

4. The method of claim 1, wherein the semantically tagging enables a structured query search of the document that was unstructured.

5. The method of claim 1, wherein at least one group of the plurality of groups is determined by a keyword that occurs in a selected document in the storage medium.

6. The method of claim 1, wherein at least one group of the plurality of groups is determined by a semantic tag that occurs in a selected document in the storage medium.

7. The method of claim 6, wherein the at least one group is represented in a semantic tag cloud.

8. The method of claim 1, further comprising: selecting a group in the plurality of groups; and updating the semantic search in accordance with the selected group.

9. A system to perform a semantic search to retrieve documents from a document repository, comprising:
a memory configured to store and retrieve data, including instructions; a processor configured to execute instructions retrieved from the memory to perform the steps:
accepting a search phrase; analyzing the search phrase and suggesting a plurality of semantic search phrases generated from a stored vocabulary of an ontology to suggest a context;
accepting a first semantic search phrase selected from the plurality of semantic search phrases;
storing in a storage medium at least one unstructured document;
indexing and semantically tagging a plurality of documents including the at least one unstructured document in the storage medium, wherein indexing and semantically tagging the plurality of documents comprises weighing a plurality of semantic concepts generated from a plurality of extracted noun phrases, wherein the plurality of semantic concepts is weighed by term significance (TS) scores, wherein the TS scores are calculated with both semantic and statistical information, and wherein the semantic information includes lexical chaining Word Sense Disambiguation (WSD) scores and Depth and Information Content (IC) values, and the statistical information includes Term Frequency (TF) and Inverse Google Popularity (IGP);

extracting a plurality of semantic tags from the indexed and semantically tagged documents; and defining one or more groups based on the indexed and semantically tagged documents, wherein the documents in the plurality of documents are indexed with unique identifications of semantic tags, and wherein the processor searches the indexed documents based on a unique identification of the first semantic search phrase.

10. The system of claim 9, wherein documents are stored in a local file and the documents are semantically indexed before the search phrase is accepted by the processor.

11. The system of claim 9, wherein the processor retrieves the at least one unstructured document via an Internet based on the search phrase and semantically tags and indexes the at least one unstructured document to make it a structured document.

12. The system of claim 9, wherein the semantically tagging enables a structured query search of the at least one document that was previously unstructured.

13. The system of claim 9, wherein at least one group of the plurality of groups is determined by a keyword that occurs in a selected document in the storage medium.

14. The system of claim 9, wherein at least one group of the plurality of groups is determined by a semantic tag that occurs in a selected document in the storage medium.

15. The system of claim 14, wherein the at least one group is represented in a semantic tag cloud.

16. The system of claim 9, further comprising the steps performed by the processor: selecting a group in the plurality of groups; and updating the semantic search in accordance with the selected group.

\* \* \* \* \*